(12) United States Patent
Miwa et al.

(10) Patent No.: US 9,829,946 B2
(45) Date of Patent: Nov. 28, 2017

(54) POWER RECEPTION CONTROL DEVICE, POWER RECEPTION DEVICE, POWER TRANSMISSION AND RECEPTION SYSTEM, AND ELECTRONIC DEVICE

(71) Applicant: Semiconductor Energy Laboratory Co., Ltd., Atsugi-shi, Kanagawa-ken (JP)

(72) Inventors: Misako Miwa, Sendai (JP); Yutaka Shionoiri, Isehara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 15/059,705

(22) Filed: Mar. 3, 2016

(65) Prior Publication Data

US 2016/0187946 A1   Jun. 30, 2016

Related U.S. Application Data

(63) Continuation of application No. 13/865,418, filed on Apr. 18, 2013, now Pat. No. 9,285,848.

(30) Foreign Application Priority Data

Apr. 27, 2012   (JP) ................. 2012-102271

(51) Int. Cl.
*G06F 1/32*   (2006.01)
*G06F 1/26*   (2006.01)
*G06F 1/28*   (2006.01)

(52) U.S. Cl.
CPC ............ *G06F 1/26* (2013.01); *G06F 1/28* (2013.01); *G06F 1/3278* (2013.01);
(Continued)

(58) Field of Classification Search
CPC ........................................ G06F 1/26
(Continued)

(56) References Cited

U.S. PATENT DOCUMENTS 5,731,856 A   3/1998   Kim et al.
5,744,864 A   4/1998   Cillessen et al.
(Continued)

FOREIGN PATENT DOCUMENTS

EP   1737044 A   12/2006
EP   2226847 A   9/2010
(Continued)

OTHER PUBLICATIONS

Fortunato.E et al., "Wide-Bandgap High-Mobility ZnO Thin-Film Transistors Produced at Room Temperature", Appl. Phys. Lett. (Applied Physics Letters), Sep. 27, 2004, vol. 85, No. 13, pp. 2541-2543.

(Continued)

*Primary Examiner* — Jaweed A Abbaszadeh
*Assistant Examiner* — Volvick Derose
(74) *Attorney, Agent, or Firm* — Robinson Intellectual Property Law Office; Eric J. Robinson

(57) ABSTRACT

Provided is a power reception device in which power consumption at the time of wireless power supply is reduced. A power reception device is provided with a power reception control device capable of temporarily stopping supply of power supply voltage to a communication control unit for controlling communication in a break period of communication intermittently performed between a power transmission device and a power reception device. In the structure, a clock signal is generated on the basis of a power receiving signal transmitted from the power transmission device, and a period of communication intermittently performed can be measured using the clock signal. Further, a (Continued)

structure may be employed in which supply of power supply voltage to the communication unit in the power reception control device can be stopped in the break period of the communication.

17 Claims, 10 Drawing Sheets

(52) U.S. Cl.
CPC .......... *G06F 1/3287* (2013.01); *G06F 1/3203* (2013.01); *Y02B 60/126* (2013.01); *Y02B 60/1282* (2013.01)

(58) Field of Classification Search
USPC ........................................................ 713/300
See application file for complete search history.

(56) References Cited

U.S. PATENT DOCUMENTS

| | | |
|---|---|---|
| 6,294,274 B1 | 9/2001 | Kawazoe et al. |
| 6,563,174 B2 | 5/2003 | Kawasaki et al. |
| 6,727,522 B1 | 4/2004 | Kawasaki et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,732,819 B2 | 6/2010 | Akimoto et al. |
| 8,188,709 B2 | 5/2012 | Onishi et al. |
| 8,400,278 B2 | 3/2013 | Koyama |
| 8,593,856 B2 | 11/2013 | Koyama et al. |
| 8,810,375 B2 | 8/2014 | Koyama |
| 8,928,645 B2 | 1/2015 | Miyake et al. |
| 9,147,462 B2 | 9/2015 | Koyama et al. |
| 9,202,546 B2 | 12/2015 | Yamazaki et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0111691 A1* | 6/2003 | So ................... H01L 21/02422 257/347 |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0273423 A1* | 11/2007 | Kadanka ................... G06F 1/04 327/291 |
| 2007/0285246 A1* | 12/2007 | Koyama .................. G06F 1/263 340/572.1 |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0101103 A1* | 5/2008 | Sato .................. H02M 3/33507 363/97 |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0200119 A1* | 8/2008 | Onishi .................. H04B 1/3883 455/41.1 |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0237252 A1 | 9/2009 | Inano et al. |
| 2009/0278122 A1 | 11/2009 | Hosono et al. |
| 2009/0280600 A1 | 11/2009 | Hosono et al. |
| 2010/0065384 A1 | 3/2010 | Tokunaga |
| 2010/0092800 A1 | 4/2010 | Itagaki et al. |
| 2010/0109002 A1 | 5/2010 | Itagaki et al. |
| 2011/0089417 A1 | 4/2011 | Yamazaki et al. |
| 2011/0101351 A1 | 5/2011 | Yamazaki |
| 2011/0109377 A1* | 5/2011 | Fujibe .............. G01R 31/31721 327/538 |
| 2011/0127951 A1* | 6/2011 | Walley .................... H02J 7/025 320/108 |
| 2011/0316349 A1 | 12/2011 | Hashiguchi et al. |
| 2012/0170355 A1 | 7/2012 | Ohmaru et al. |
| 2012/0293201 A1 | 11/2012 | Fujita et al. |
| 2012/0311365 A1 | 12/2012 | Yoneda et al. |
| 2013/0015705 A1* | 1/2013 | Abe ........................ H02J 5/005 307/29 |
| 2013/0147279 A1* | 6/2013 | Muratov .................. H02J 5/005 307/104 |
| 2013/0236192 A1* | 9/2013 | Deicke ................. G06F 1/1632 398/135 |
| 2014/0028093 A1* | 1/2014 | Aikawa .................... H02J 7/025 307/11 |

(56) References Cited

U.S. PATENT DOCUMENTS

| | | |
|---|---|---|
| 2014/0167041 A1 | 6/2014 | Yamazaki et al. |
| 2016/0079245 A1 | 3/2016 | Yamazaki et al. |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2008-009972 A | 1/2008 |
| JP | 2009-189231 A | 8/2009 |
| JP | 2009-230551 A | 10/2009 |
| JP | 2010-200415 A | 9/2010 |
| JP | 2010-219838 A | 9/2010 |
| JP | 2011-171723 A | 9/2011 |
| JP | 2011-223716 A | 11/2011 |
| JP | 2012-008535 A | 1/2012 |
| WO | WO-2004/114391 | 12/2004 |
| WO | WO-2007/139205 | 12/2007 |
| WO | WO-2011/089847 | 7/2011 |

OTHER PUBLICATIONS

Dembo.H et al., "RFCPUS on Glass and Plastic Substrates Fabricated by TFT Transfer Technology", IEDM 05: Technical Digest of International Electron Devices Metting, Dec. 5, 2005, pp. 1067-1069.

Ikeda.T et al., "Full-Functional System Liquid Crystal Display Using CG-Silicon Technology", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment"; Appl. Phys. Lett. (Applied Physics Letters) , Jun. 26, 2007, vol. 90, No. 26, pp. 262106-1-262106-3.

Takahashi.M et al., "Theoretical Analysis of IgZo Transparent Amorphous Oxide Semiconductor", IDW '08 : Proceedings of The 15th International Display Workshops, Dec. 3, 2008, pp. 1637-1640.

Hayashi.R et al., "42.1: Invited Paper: Improved Amorphous In—Ga—Zn—O TFTs", SID Digest '08 : SID International Symposium Digest of Technical Papers, May 20, 2008, vol. 39, pp. 621-624.

Prins.M et al., "A Ferroelectric Transparent Thin-Film Transistor", Appl. Phys. Lett. (Applied Physics Letters) , Jun. 17, 1996, vol. 68, No. 25, pp. 3650-3652.

Nakamura.M et al., "The phase relations in the $In_2O_3$—$Ga_2ZnO_4$—ZnO system at 1350° C.", Journal of Solid State Chemistry, Aug. 1, 1991, vol. 93, No. 2, pp. 298-315.

Kimizuka.N et al., "Syntheses and Single-Crystal Data of Homologous Compounds, $In_2O_3(ZnO)m$ (m =3, 4, and 5), $InGaO_3(ZnO)3$, and $Ga_2O_3(ZnO)m$ (m=7, 8, 9, and 16) in the $In_2O_3$—$ZnGa_2O_4$—ZnO System", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor", Science, May 23, 2003, vol. 300, No. 5623, pp. 1269-1272.

Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.

Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.

Osada.T et al., "15.2: Development of Driver-Integrated Panel using Amorphous In—Ga—Zn—Oxide TFT", SID Digest '09 : SID International Symposium Digest of Technical Papers, May 31, 2009, pp. 184-187.

Nomura.K et al., "Carrier transport in transparent oxide semiconductor with intrinsic structural randomness probed using single-crystalline $InGaO_3(ZnO)5$ films", Appl. Phys. Lett. (Applied Physics Letters) , Sep. 13, 2004, vol. 85, No. 11, pp. 1993-1995.

Li.C et al., "Modulated Structures of Homologous Compounds $InMO_3(ZnO)m$ (M=In,Ga; m=Integer) Described by Four-Dimensional Superspace Group", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GiZo ($Ga_2O_3$—$In_2O_3$—ZnO) TFT", SID Digest '08 : SID International Symposium Digest of Technical Papers, May 20, 2008, vol. 39, pp. 633-636.

Lee.J et al., "World'S Largest (15-Inch) XGA AMLCD Panel Using IgZo Oxide TFT", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDS", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing $MoO_3$ as a Charge-Generation Layer", Adv. Mater. (Advanced Materials), 2006, vol. 18, No. 3, pp. 339-342.

Tsuda.K et al., "Ultra Low Power Consumption Technologies for Mobile TFT-LCDs", IDW '02 : Proceedings of The 9th International Display Workshops, Dec. 4, 2002, pp. 295-298.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems", Journal of Solid-State Circuits, 2008, vol. 43, No. 1, pp. 292-299.

Ohara.H et al., "Amorphous In—Ga—Zn—Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

Cho.D et al., "21.2:Al and Sn-Doped Zinc Indium Oxide Thin Film Transistors for AMOLED Back-plane", SID Digest '09 : SID International Symposium Digest of Technical Papers, May 31, 2009, pp. 280-283.

Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.

(56) References Cited

OTHER PUBLICATIONS

Jin.D et al., "65.2:Distinguished Paper:World-Largest (6.5") Flexible Full Color Top Emission AMOLED Display on Plastic Film and Its Beinding Properties", SID Digest '09 : SID International Symposium Digest of Technical Papers, May 31, 2009, pp. 983-985.

Sakata.J et al., "Development of 4.0-In. AMOLED Display With Driver Circuit Using Amorphous In—Ga—Zn—Oxide TFTs", IDW '09 : Proceedings of The 16th International Display Workshops, 2009, pp. 689-692.

Park.J et al., "Amorphous Indium-Gallium-Zinc Oxide TFTs and Their Application for Large Size AMOLED", AM-FPD '08 Digest of Technical Papers, Jul. 2, 2008, pp. 275-278.

Park.S et al., "Challenge to Future Displays: Transparent AM-OLED Driven by Peald Grown ZnO TFT", IMID '07 Digest, 2007, pp. 1249-1252.

Godo.H et al., "Temperature Dependence of Characteristics and Electronic Structure for Amorphous In—Ga—Zn—Oxide TFT", AM-FPD '09 Digest of Technical Papers, Jul. 1, 2009, pp. 41-44.

Osada.T et al., "Development of Driver-Integrated Panel Using Amorphous In—Ga—Zn—Oxide TFT", AM-FPD '09 Digest of Technical Papers, Jul. 1, 2009, pp. 33-36.

Hirao.T et al., "Novel Top-Gate Zinc Oxide Thin-Film Transistors (ZnO TFTs) for AMLCDS", J. Soc. Inf. Display (Journal of the Society for Information Display), 2007, vol. 15, No. 1, pp. 17-22.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In—Ga—Zn—Oxide TFT", SID Digest '09 : SID International Symposium Digest of Technical Papers, May 31, 2009, pp. 1110-1112.

Ohara.H et al., "21.3:4.0 In. QVGA AMOLED Display Using In—Ga—Zn—Oxide TFTs With a Novel Passivation Layer", SID Digest '09 : SID International Symposium Digest of Technical Papers, May 31, 2009, pp. 284-287.

Miyasaka.M, "SUFTLA Flexible Microelectronics on Their Way to Business", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.

Asaoka.Y et al., "29.1:Polarizer-Free Reflective LCD Combined With Ultra Low-Power Driving Technology", SID Digest '09 : SID International Symposium Digest of Technical Papers, May 31, 2009, pp. 395-398.

Lee.H et al., "Current Status of, Challenges to, and Perspective View of AM-OLED", IDW '06 : Proceedings of The 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application", SID Digest '07 : SID International Symposium Digest of Technical Papers, 2007, vol. 38, pp. 1737-1740.

Nakamura.M, "Synthesis of Homologous Compound with New Long-Period Structure", NIRIM Newsletter, Mar. 1, 1995, vol. 150, pp. 1-4.

Kikuchi.H et al., "Polymer-Stabilized Liquid Crystal Blue Phases", Nature Materials, Sep. 2, 2002, vol. 1, pp. 64-68.

Kimizuka.N et al., "Spinel,YbFe2O4, and Yb2Fe3O7 Types of Structures for Compounds in the In2O3 and Sc2O3—A2O3—Bo Systems [A; Fe, Ga, or Al; B: Mg, Mn, Fe, Ni, Cu,or Zn] at Temperatures over 1000° C.", Journal of Solid State Chemistry, 1985, vol. 60, pp. 382-384.

Kitzerow.H et al., "Observation of Blue Phases in Chiral Networks", Liquid Crystals, 1993, vol. 14, No. 3, pp. 911-916.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors", Jpn. J. Appl. Phys. (Japanese Journal of Applied Physics), 2006, vol. 45, No. 5B, pp. 4303-4308.

Janotti.A et al., "Native Point Defects in ZnO", Phys. Rev. B (Physical Review. B), Oct. 4, 2007, vol. 76, No. 16, pp. 165202-1-165202-22.

Park.J et al., "Electronic Transport Properties of Amorphous Indium-Gallium-Zinc Oxide Semiconductor Upon Exposure to Water", Appl. Phys. Lett. (Applied Physics Letters), 2008, vol. 92, pp. 072104-1-072104-3.

Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.

Janotti.A et al., "Oxygen Vacancies in ZnO", Appl. Phys. Lett. (Applied Physics Letters), 2005, vol. 87, pp. 122102-1-122102-3.

Oba.F et al., "Defect energetics in ZnO: A hybrid Hartree-Fock density functional study", Phys. Rev. B. (Physical Review. B), 2008, vol. 77, pp. 245202-12450202-6.

Orita.M et al., "Amorphous transparent conductive oxide InGaO3(ZnO)m (m<4):a Zn4s conductor", Philosophical Magazine, 2001, vol. 81, No. 5, pp. 501-515.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays", IFW '08 : Proceedings of The 6th International Display Workshops, Dec. 3, 2008, pp. 581-584.

Kim.S et al., "High-Performance oxide thin film transistors passivated by various gas plasmas", 214th ECS Meeting, 2008, No. 2317, ECS.

Clark.S et al., "First Principles Methods Using CASTEP", Zeitschrift fur Kristallographie, 2005, vol. 220, pp. 567-570.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers", J. Electrochem. Soc. (Journal of The Electrochemical Society), 2008, vol. 155, No. 12, pp. H1009-H1014.

Ueno.K et al., "Field-Effect Transistor on SrTiO3 With Sputtered Al2O3 Gate Insulator", Appl. Phys. Lett. (Applied Physics Letters), Sep. 1, 2003, vol. 83, No. 9, pp. 1755-1757.

* cited by examiner

POWER RECEPTION CONTROL DEVICE, POWER RECEPTION DEVICE, POWER TRANSMISSION AND RECEPTION SYSTEM, AND ELECTRONIC DEVICE

BACKGROUND OF THE INVENTION

1. Field of the Invention

The present invention relates to a power reception device that is wirelessly supplied with power and a control device thereof. Further, the present invention relates to a power transmission and reception system that wirelessly transmits and receives power. Furthermore, the present invention relates to an electronic device that is wirelessly supplied with power.

2. Description of the Related Art

A wireless power supply technique for wirelessly supplying power from a power transmission device to a power reception device by electromagnetic induction has been studied and come into practical use. In recent years, a wireless power supply technique for supplying power by electromagnetic resonance (electromagnetic resonant coupling) that enables long-distance power transmission as compared to a wireless power supply technique for supplying power by electromagnetic induction has attracted attention. Unlike by electromagnetic induction, by electromagnetic resonance, high power transmission efficiency can be achieved even when transmission distance is several meters, and power loss due to misalignment of an antenna of a power transmission device and an antenna of a power reception device can be reduced. For example, Patent Document 1 discloses a wireless power supply technique utilizing electromagnetic resonance.

Further, in order to ensure safety of equipment (power reception equipment) including a power reception device, a method is known in which information on individual certification, a charge state, requiring power, and the like of the power reception equipment is transmitted between a power transmission device and the power reception device so that power transmission is controlled (see Patent Document 2).

REFERENCE

Patent Documents

[Patent Document 1] Japanese Published Patent Application No. 2010-219838
[Patent Document 2] Japanese Published Patent Application No. 2011-223716

SUMMARY OF THE INVENTION

Even in the case where high power transmission efficiency is achieved by a power supply system, the higher the power consumption of the power reception device is, the greater the loss is. Specifically, a power reception device provided with such a communication function needs to reduce power consumption of a control unit which controls communication.

The present invention is made in view of the foregoing technical background. It is an object of one embodiment of the present invention to provide a power reception device in which power consumption at the time of wireless power supply is reduced. Further, it is another object of one embodiment of the present invention to provide an electronic device or a power transmission and reception system in which power consumption at the time of wireless power supply is reduced.

Note that one embodiment of the present invention achieves at least one of the above objects.

In order to achieve the object, the present inventors conceived a structure of a power reception device including a power reception control device capable of temporarily stopping supply of power supply voltage to a communication control unit for controlling communication in a break period of communication intermittently performed between a power transmission device and a power reception device. In the structure, a clock signal is generated on the basis of a power receiving signal transmitted from the power transmission device, and a period of communication intermittently performed can be measured using the clock signal. Further, a structure may be employed in which supply of power supply voltage to the communication unit in the power reception control device can be stopped in the break period of communication.

That is, a power reception control device according to one embodiment of the present invention includes a power receiving detection unit configured to detect a power receiving signal and to output a detection signal; a clock generation unit configured to generate a clock signal from the power receiving signal; a communication control unit configured to generate a transmission signal to be transmitted to a transmitting device on the basis of a reception signal transmitted from the transmitting device; a power source control unit configured to start on the basis of the detection signal and to control supply of power supply voltage to the communication control unit; and a counter unit configured to measure a period for performing communication on the basis of the clock signal, to request the power source control unit to supply the power supply voltage before performing the communication, and to request the power source control unit to stop the supply of the power supply voltage after completion of the communication.

With such a structure, on the basis of the clock signal generated in the clock generation unit during power reception, timing of the communication intermittently performed can be measured by the counter unit, and the supply of the power supply voltage to the communication control unit can be surely stopped in a break period of the communication. Further, in a period where power reception is not performed, only the power receiving detection unit is activated, and units other than the power receiving detection unit can be deactivated; thus, power consumption in a standby state can be reduced. Here, "a circuit or the like is activated" means a state where power supply voltage is supplied so that operation is possible; on the other hand, "a circuit or the like is deactivated" means a state where supply of power supply voltage is stopped.

Further, it is preferable that the communication control unit in the power reception control device include an arithmetic unit and a memory unit, and the memory unit include a memory element capable of writing and reading data in a period where the power supply voltage is supplied and holding data even after the supply of the power supply voltage is stopped.

With such a structure, data used for the communication can be held even in a period where the supply of the power supply voltage to the communication control unit is stopped, and the communication control unit can generate a transmission signal on the basis of the data after the supply of the power supply voltage is resumed.

Further, it is preferable that the communication control unit in the power reception control device include an arithmetic unit and a memory unit, and the memory unit include a volatile memory element capable of writing and reading data in a period where the power supply voltage is supplied and a memory element capable of saving the data stored in the volatile memory element before the supply of the power supply voltage is stopped and holding the data even after the supply of the power supply voltage is stopped.

With such a structure, high-speed communication is possible by performing processing of the arithmetic unit using a volatile memory element capable of writing and reading data at high speed in the period where the power supply voltage is supplied. Further, the data stored in the volatile memory element is saved just before the supply of the power supply voltage is stopped in the memory element (such a memory element is also referred to as a nonvolatile memory element) capable of holding data even after the supply of the power supply voltage is stopped, so that data can be prevented from being lost. When the supply of the power supply voltage is resumed, the data stored in the nonvolatile memory element is transferred to the volatile memory element, so that communication operation can be started promptly.

Examples of the volatile memory element capable of high-speed operation include a flip-flop, a static random access memory (SRAM), and the like.

Further, as the memory element capable of holding data even after the supply of the power supply voltage is stopped, a magnetoresistive random access memory (MRAM), a resistance random access memory (ReRAM), a ferroelectric random access memory (FeRAM), or the like can be used.

Specifically, a memory element which is capable of holding data even when supply of power supply voltage is stopped, and in which supply, holding, and release of electric charge to, in, and from a capacitor or a floating node are controlled by a transistor with extremely low off-state current is preferably used. Further, the transistor includes, in a channel formation region, a semiconductor whose band gap is wider than that of silicon and whose intrinsic carrier density is lower than that of silicon. In the case of using such a memory device, data is written by supply of electric charge; therefore, a current necessary for writing data can be reduced to approximately $\frac{1}{100}$ that of an MRAM or the like. As a result, the use of a memory unit including the memory element in the power reception control device can further reduce power consumption.

Further, one embodiment of the present invention is a power reception device including any one of the above power reception control devices, a rectifier circuit to which a power receiving signal is input and which converts AC power included in the power receiving signal to DC power, and a power storage device which stores the DC power.

With use of a power reception device provided with a power reception control device according to one embodiment of the present invention, power consumption of the power reception device is reduced not only during power reception but also during a period where the power reception is not performed.

Moreover, it is preferable that the power reception device include a charge detection unit configured to detect a charge state of the power storage device and to transmit a signal to the communication control unit and the communication control unit generate a transmission signal which requests the power transmission device to stop transmission of the power receiving signal.

With such a structure, overcharge of the power storage device can be prevented; thus, a power reception device with a high level of safety can be obtained.

One embodiment of the present invention is a power transmission and reception system including any one of the power reception devices, and a power transmission device which controls transmission of a power receiving signal on the basis of a transmission signal from the power reception device.

By combination of the power reception device and the power transmission device according to one embodiment of the present invention, a power transmission and reception system in which power consumption at the time of wireless power supply is reduced and power transmission efficiency is improved can be achieved.

One embodiment of the present invention is an electronic device including any one of the above power reception devices.

A power reception device according to one embodiment of the present invention is provided for an electronic device, whereby an electronic device in which power consumption at the time of wireless power supply is reduced can be achieved.

According to the present invention, a power reception device in which power consumption at the time of wireless power supply is reduced can be provided. Further, an electronic device or a power transmission system in which power consumption at the time of wireless power supply is reduced can be provided.

DETAILED DESCRIPTION OF THE INVENTION

Figure 1A:
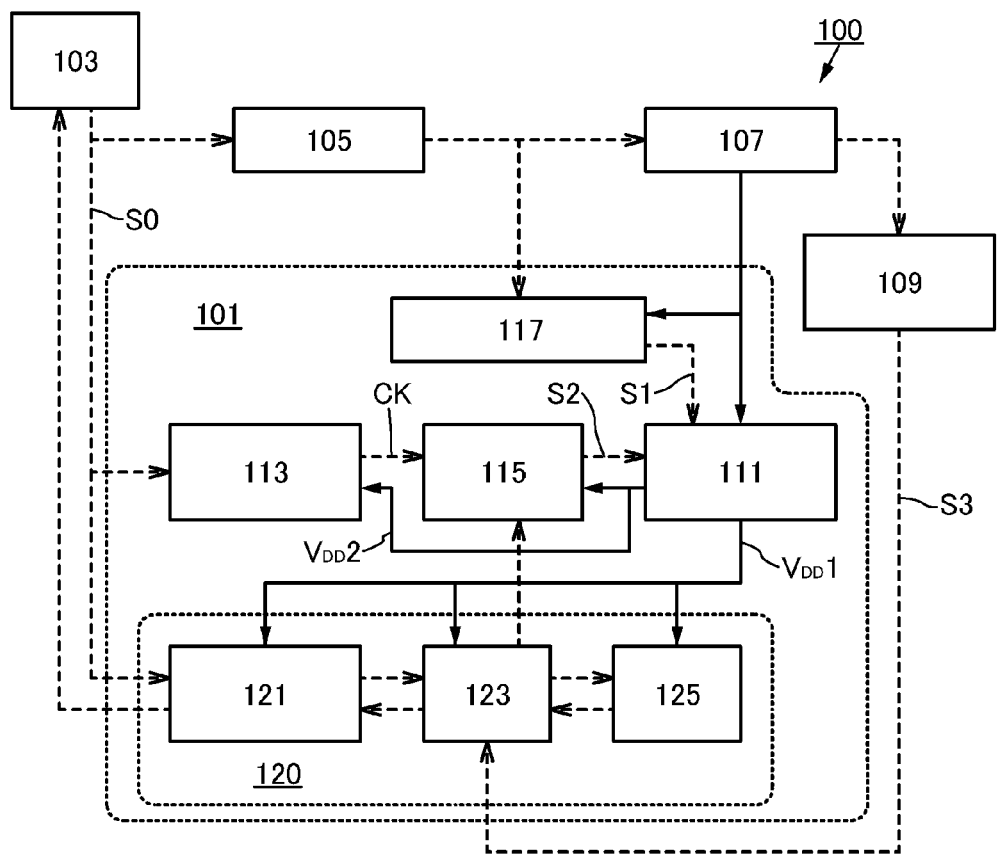
FIGS. 1A and 1B illustrate a structural example of a power reception device according to one embodiment of the present invention.

Embodiments of the present invention will be described in detail with reference to the drawings. Note that the invention is not limited to the following description, and it will be easily understood by those skilled in the art that various changes and modifications can be made without departing from the spirit and scope of the invention. Therefore, the invention should not be construed as being limited to the description in the following embodiments. Note that in the structures of the invention described below, the same portions or portions having similar functions are denoted by the same reference numerals in different drawings, and description of such portions is not repeated.

Note that in each drawing described in this specification, the size, the layer thickness, or the region of each component is exaggerated for clarity in some cases. Therefore, embodiments of the present invention are not limited to such scales.

A transistor is a kind of semiconductor elements and can achieve amplification of a current or a voltage, switching operation for controlling conduction or non-conduction, or the like. A transistor in this specification includes an insulated-gate field effect transistor (IGFET) and a thin film transistor (TFT).

Functions of a "source" and a "drain" are sometimes replaced with each other when a transistor of opposite polarity is used or when the direction of current flowing is changed in circuit operation, for example. Therefore, the terms "source" and "drain" can be used to denote the drain and the source, respectively, in this specification.

In this specification and the like, one of a source and a drain of a transistor is called a "first electrode" and the other of the source and the drain is called a "second electrode" in some cases. Note that a gate is referred to as a "gate" or a "gate electrode".

In this specification and the like, two terminals of a two-terminal element such as a coil, a resistor, or a capacitor are referred to as a "first terminal" and a "second terminal" or a "first electrode" and a "second electrode" in some cases. In addition, one of the terminals is simply referred to as a "terminal", "electrode", "one end", "one", or the like in some cases.

Note that in this specification and the like, the term "electrically connected" includes the case where components are connected through an object having any electric function. There is no particular limitation on an object having any electric function as long as electric signals can be transmitted and received between components that are connected through the object. Examples of an "object having any electric action" include a switching element such as a transistor, a resistor, a coil, a capacitor, and an element with a variety of functions in addition to an electrode and a wiring.

Note that a node in this specification and the like means an element (e.g., a wiring) which enables electric connection between elements included in a circuit. Therefore, a "node to which A is connected" is a wiring which is electrically connected to A and can be regarded as having the same potential as A. Even when one or more elements which enable electrical connection (e.g., switches, transistors, capacitors, inductors, resistors, or diodes) are in a portion of the wiring, the wiring can be regarded as the "node to which A is connected" as long as it has the same potential as A.

[Embodiment 1]

In this embodiment, a power reception device provided with a power reception control device according to one embodiment of the present invention will be described with reference to the drawings.

[Structural Example]

FIG. 1A is a block diagram of a power reception device 100 exemplified in this embodiment. The arrow indicated by a solid line in FIG. 1A shows the direction of power supply voltage supplied to drive main components. The arrow indicated by a broken line shows the direction of a signal transmitted between main components.

The power reception device 100 includes a power reception control device 101, a power receiving unit 103, a rectifier circuit 105, a power storage device 107, and a charge detection unit 109.

The power receiving unit 103 receives power wirelessly from a power transmission device and outputs a power receiving signal S0 to each unit. The power receiving unit 103 is provided with a coil, an antenna, and the like used in a wireless power supply method such as an electromagnetic induction method, an electric field coupling method, or an electromagnetic resonance method, for example. In addition, the power receiving unit 103 may be provided with a capacitor for adjusting impedance.

The power receiving signal S0 includes a reception signal transmitted from the power transmission device. As the power receiving signal S0, a signal in which a reception signal is superimposed on high-frequency voltage by a modulation method such as amplitude modulation can be used, for example.

The rectifier circuit 105 rectifies AC power input from the power receiving unit 103 and converts it into DC power. A structure of the rectifier circuit 105 is not specifically limited; however, an all-wave rectifier circuit with high rectification efficiency is preferably used. Further, the rectifier circuit 105 may be provided with a constant voltage circuit such as a regulator, a DCDC converter, and the like.

The power storage device 107 stores the DC power which has been converted by the rectifier circuit 105. As the power storage device 107, a secondary battery which can be charged and discharged repeatedly can be used; for example, a lithium ion battery may be used.

The charge detection unit 109 detects a charge state of the power storage device 107, and outputs information thereof to an arithmetic unit 123 to be described later. Examples of a method for detecting the charge state of the power storage device 107 include a method in which a potential difference (voltage) between a pair of electrodes of the secondary battery is measured, and the like. Here, it is preferable that the charge detection unit 109 be provided with an AD converter and the AD converter convert a measured voltage into a digital signal and output the digital signal to the arithmetic unit 123.

The power reception control device 101 controls communication between the power reception device 100 and the power transmission device. The power reception control device 101 includes a power source control unit 111, a clock generation unit 113, a counter unit 115, a power receiving detection unit 117, and a communication control unit 120.

The power source control unit 111 controls supply of power supply voltage supplied to the communication control unit 120, the counter unit 115 and the clock generation unit 113. Here, power supply voltage which is supplied from the power source control unit 111 to the communication control unit 120 is denoted by $V_{DD}1$, and power supply voltage which is supplied from the power source control unit 111 to the counter unit 115 and the clock generation unit 113 is denoted by $V_{DD}2$.

The power receiving signal S0 is input to the clock generation unit 113, and the clock generation unit 113 generates a clock signal CK with a desired frequency from a high frequency voltage included in the power receiving signal S0.

As the clock generation unit 113, for example, a phase-locked loop (PLL) circuit can be used.

The clock signal CK generated by the clock generation unit 113 is input to the counter unit 115, and the counter unit 115 measures a period of communication operation intermittently performed on the basis of the clock signal CK. Further, on the basis of a result of measuring a period of communication operation, the counter unit 115 requests the power source control unit 111 to start supply of the power supply voltage $V_{DD}1$ through a signal S2. Specifically, the counter unit 115 requests the power source control unit 111 to start the supply of the power supply voltage $V_{DD}1$ before performing the communication operation.

A signal indicating termination of communication is input from the arithmetic unit 123 in the communication control unit 120 which is to be described later to the counter unit 115. In accordance with the signal, the counter unit 115 requests the power source control unit 111 to stop the supply of the power supply voltage $V_{DD}1$ through the signal S2. Thus, after the communication operation is completed, the supply of power supply voltage $V_{DD}1$ is stopped.

By detecting an output potential of the rectifier circuit 105, the power receiving detection unit 117 detects whether the power receiving unit 103 receives power and outputs a detection signal S1 to the power source control unit 111. The power receiving detection unit 117 may include a comparator and the like, for example.

The power receiving detection unit 117 is preferably activated (a state where operation is possible) even when no power is supplied to the power receiving unit 103, in which case the power receiving detection unit 117 may by supplied with power supply voltage from the power storage device 107. Note that when power supply voltage is periodically supplied to the power receiving detection unit 117 and the power receiving detection unit 117 is intermittently activated (the state where operation is possible), standby power of the power reception control device 101 can be reduced.

Here, the power source control unit 111 can start in accordance with the detection signal S1 from the power receiving detection unit 117. Specifically, when the power receiving detection unit 117 detects power reception, the power source control unit 111 starts in accordance with the detection signal S1 and starts to supply the power supply voltage $V_{DD}1$ to the communication control unit 120 and the power supply voltage $V_{DD}2$ to the counter unit 115 and the clock generation unit 113.

Figure 1B:
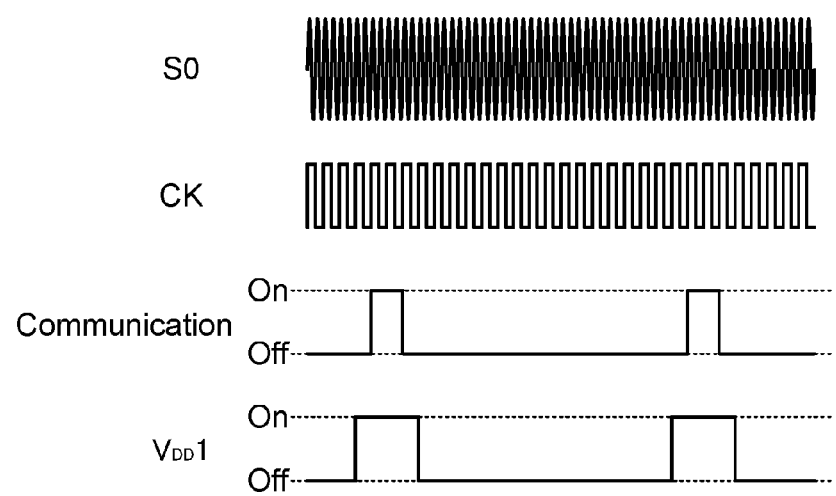

FIG. 1B is a schematic diagram showing a change over time during power reception in the power receiving signal S0, the clock signal CK, the power supply voltage $V_{DD}1$, and the state of communication.

During the power reception, high frequency voltage is always transmitted from the power transmission device, and the power receiving unit 103 which has received the high frequency voltage outputs the power receiving signal S0. Further, a clock signal CK is generated in the clock generation unit 113 in accordance with the power receiving signal S0. Here, the power supply voltage $V_{DD}1$ is supplied to the communication control unit 120 before the start of the communication operation and then the communication control unit 120 is activated (starts), so that the communication starts. After the communication operation is terminated, the supply of the power supply voltage $V_{DD}1$ is stopped, whereby the communication control unit 120 is deactivated.

Here, for example, a time required for one communication operation is several 10 microseconds to several milliseconds, and a period (a break period) after the end of the communication operation and before the start of the next communication operation is about several 100 milliseconds to several seconds. As described above, the time for the communication operation during the power reception is very short; thus, power consumption can be reduced by deactivating the communication control unit 120 during the break period. Here, "a circuit or the like is activated" means a state where power supply voltage is supplied so that operation is possible; on the other hand, "a circuit or the like is deactivated" means a state where supply of power supply voltage is stopped.

Further, in the case where the reception signal from the power transmission device cannot be received for some reasons such as communication failure, the communication control unit 120 keeps an activated state until the next reception signal is received, whereby communication can be resumed. Further, the counter unit 115 starts the measurement again from the point at which the communication is terminated; thus, it is possible to promptly return to normal operation even when communication failure and the like occur.

The communication control unit 120 includes an interface 121, the arithmetic unit 123, and a memory unit 125.

The power receiving signal S0 is input to the interface 121, and the interface 121 demodulates a reception signal included in the receiving signal S0 so as to convert it into a digital signal, and outputs the digital signal to the arithmetic unit 123. Further, the interface 121 modulates a transmission signal that is the digital signal input from the arithmetic unit 123 and outputs it to the power receiving unit 103.

The arithmetic unit 123 performs arithmetic processing in accordance with an instruction included in the reception signal and generates a transmission signal to be transmitted to the power transmission device. Note that the transmission signal generated in the arithmetic unit 123 is modulated in the interface 121 and transmitted to the power transmission device through the power receiving unit 103.

Further, the arithmetic unit 123 can read data used in the arithmetic processing from the memory unit 125 or can write data to the memory unit 125.

Further, in accordance with information on the charge state of the power storage device 107, which is input from the charge detection unit 109, the arithmetic unit 123 generates a transmission signal.

Here, the transmission signal generated in the arithmetic unit 123 includes information on individual certification of the power reception device 100 (or equipment in which the power reception device 100 is incorporated), information on the charge state of the power storage device 107, and the like. In the case where the charging of the power storage device 107 is completed, a signal which requests the power transmission device to stop power transmission and the like may be included.

Further, the arithmetic unit 123 can detect an abnormality of the power storage device 107 from a signal S3 input from the charge detection unit 109 and request the power transmission device to stop power transmission. For example, in the case where the potential of the power storage device 107 is higher than the assumed upper limit, it is judged that abnormalities in overcharge have occurred. On the other hand, in the case where the potential of the power storage device 107 is lower than the assumed lower limit, it is judged that a problem such as leakage has been generated in the power storage device 107. In either case, the arithmetic unit 123 requests the power transmission device to stop the power transmission.

Further, individual certification between the power transmission device and the power reception device 100 is performed, whereby an electronic device is prevented from being broken down by power supply to an untended electronic device.

The memory unit 125 is provided with a memory element capable of holding data even after the supply of the power supply voltage is stopped (also referred to as a nonvolatile memory element). By the nonvolatile memory element, data used for generating a transmission signal can be held even in a period where supply of the power supply voltage $V_{DD}1$ is stopped.

Further, the memory unit 125 is preferably provided with both a volatile memory capable of writing and reading at high speed, and a nonvolatile memory. During a period where the power supply voltage $V_{DD}1$ is supplied, high-speed operation of the communication control unit 120 can be achieved by the use of the volatile memory. Further, the data stored in the volatile memory is saved in the nonvolatile memory just before the supply of the power supply voltage $V_{DD}1$ is stopped, so that the data can be prevented from being lost. The data saved in the nonvolatile memory element is restored to the volatile memory when the supply of the power supply voltage $V_{DD}1$ is resumed, so that communication operation can be started promptly.

Examples of a volatile memory capable of high-speed operation are a flip-flop, a SRAM, and the like.

Further, as the memory element capable of holding data even after the supply of the power supply voltage is stopped, an MRAM, a ReRAM, an FeRAM, or the like can be used.

In addition, as the memory element which holds specific data such as data for individual certification, a nonvolatile memory element such as a mask read only memory (MROM), a programmable read only memory (PROM), an one time programmable read only memory (OTPROM), or the like can be used.

In particular, a memory element in which supply, holding, and release of electric charge to, in, and from a capacitor or a floating node are controlled by a transistor with extremely low off-state current is preferably used. In the case of using such a memory element, data is written by supply of electric charge; therefore, a current which is necessary for writing data can be reduced to approximately 1/100 of that in the case where an MRAM is used. Thus, by the use of such a memory element in the memory unit 125, power consumption can be further reduced.

An example in which a nonvolatile memory element provided with a transistor with extremely low off-state current is applied to the memory unit 125 will be described in Embodiment 3.

The above is the description of the structural example of the power reception device 100 provided with the power reception control device 101, which is illustrated in FIG. 1A.

[Operation Example]

Figure 2:
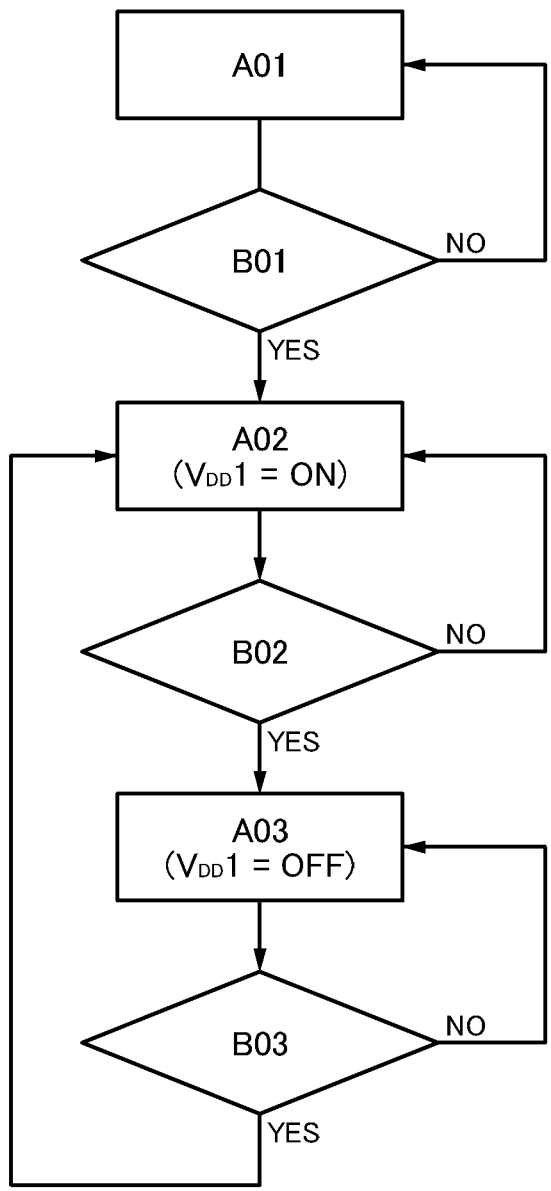
FIG. 2 illustrates an operation example of a power reception device according to one embodiment of the present invention.

Next, an operation example of the power reception control device 101 will be described. FIG. 2 is a flow chart of the operation of the power reception control device 101.

<A01: Standby State>

A standby state is a state where power reception is not detected by the power receiving detection unit 117, that is, a state where the power reception is not performed.

At this time, the power receiving detection unit 117 is activated. Further, the power source control unit 111 is deactivated and both the power supply voltage $V_{DD}1$ that is to be supplied to the communication control unit 120 and the power supply voltage $V_{DD}2$ that is to be supplied to the counter unit 115 and the clock generation unit 113 are stopped. Thus, the counter unit 115, the clock generation unit 113, and the communication control unit 120 are each in a deactivated state.

As described above, in the case where power reception is not performed, units other than the power receiving detection unit 117 is deactivated, so that power consumption in the standby state of the power reception control device 101 can be reduced.

<B01: Power Receiving Detection>

In the case where power reception is detected by the power receiving detection unit 117, operation goes on to a next phase (communication state). On the other hand, in the case where power reception is not detected, the standby state is maintained.

<A02: Communication State>

When the power receiving detection unit 117 detects power reception, the power source control unit 111 operates in accordance with the detection signal S1 which has input to the power source control unit 111, and starts to supply the power supply voltage $V_{DD}1$ to the communication control unit 120 and the power supply voltage $V_{DD}2$ to the counter unit 115 and the clock generation unit 113.

The communication state is a state where each unit in the clock generation unit 113, the counter unit 115, and the communication control unit 120 is activated.

In the communication state, the above-described communication operation is performed by the communication control unit 120.

<B02: Completion of Communication>

When the communication is completed and a signal which indicates the completion of the communication is transmitted from the arithmetic unit 123 to the counter unit 115, operation goes on to a next phase (non-communication state). Note that the communication state is maintained until the signal is transmitted.

<A03: Non-Communication State>

In accordance with the signal which indicates the completion of the communication input from the arithmetic unit 123, the counter unit 115 requests the power source control unit 111 to stop the supply of the power supply voltage through the signal S2. Accordingly, the power source control unit 111 stops the supply of the power supply voltage $V_{DD}1$ to the communication control unit 120. Meanwhile, because the power supply voltage $V_{DD}2$ is continuously supplied to the clock generation unit 113 and the counter unit 115, the clock generation unit 113 and the counter unit 115 are each maintained in an activated state.

Further, the counter unit 115 measures a time from the completion of the communication to the start of the next communication on the basis of the signal of the completion of the communication input from the arithmetic unit 123 and the clock signal CK input from the clock generation unit 113.

As described above, the supply of the power supply voltage $V_{DD}1$ to the communication control unit 120 is stopped in a break period where the communication is not performed, so that power consumption of the power reception control device 101 can be reduced.

<B03: Preparation for Communication>

On the basis of a result of measuring a period of communication operation, the counter unit 115 requests the power source control unit 111 to resume the supply of the power supply voltage $V_{DD}1$ through a signal S2 after the break period of the communication is completed and before the next communication is performed. Accordingly, operation goes on to a communication state. When there is no request from the counter unit 115, non-communication state is maintained.

<A02: Communication State>

In accordance with the request from the counter unit 115, the power source control unit 111 resumes the supply of power supply voltage $V_{DD}1$ to the communication control unit 120. Thus, the power reception control device 101 becomes in a communication state.

As described above, through the series of operations, low-power-consumption operation of the power reception control device 101 can be achieved.

Note that in the communication state, when the arithmetic unit 123 requests the power transmission device to stop power transmission in accordance with the signal from the charge detection unit 109, power transmission from the power transmission device is stopped. When the power transmission from the power transmission device is stopped, the power source control unit 111 is deactivated by the detection signal S1 input from the power receiving detection unit 117 to the power source control unit 111, and operation goes on to a standby state by the stop of the supply of the power supply voltage $V_{DD}1$ and the power supply voltage $V_{DD}2$.

The above is the description of the operation of the power reception control device 101.

[Modification Example]

In the above, a structure in which the power receiving unit 103 receives the power receiving signal S0 including a reception signal is illustrated; however, a power receiving unit which receives power and a transmission/reception unit which is used for communication may be separately provided.

Figure 3:
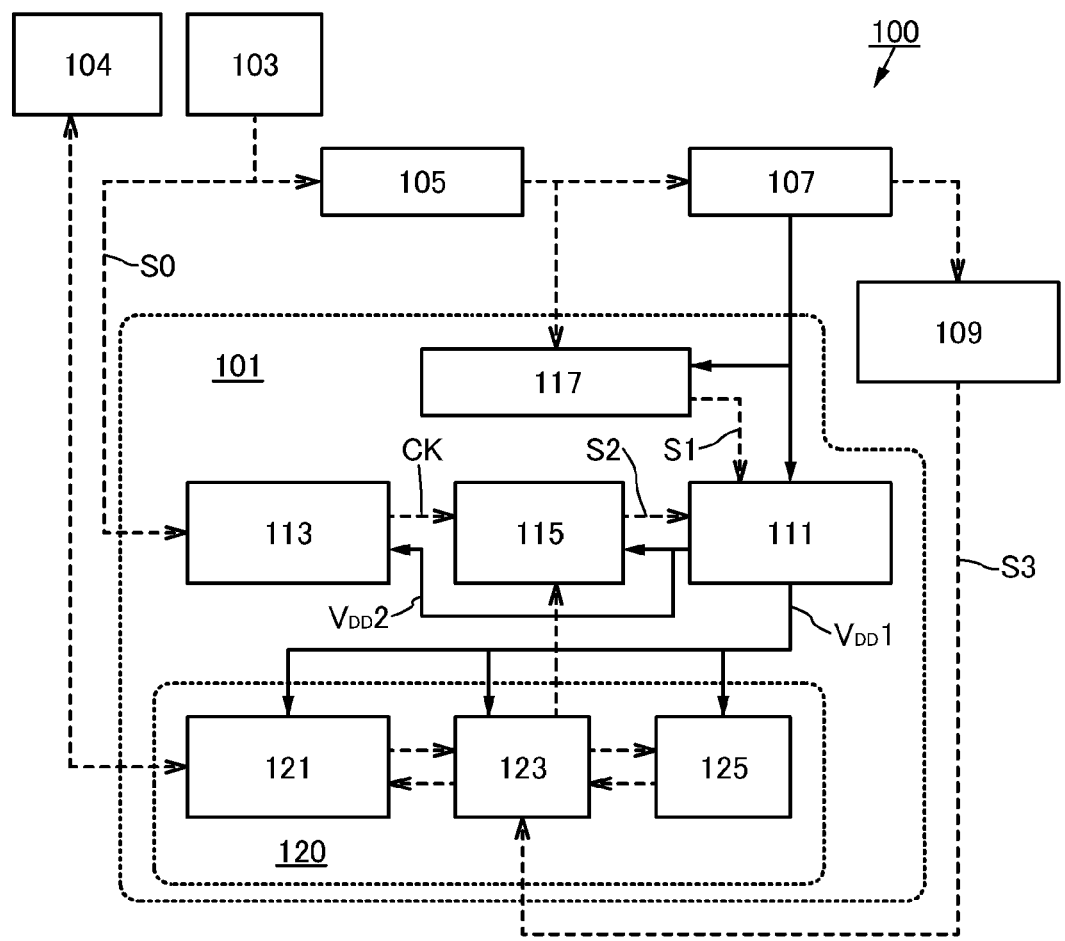
FIG. 3 illustrates a structural example of a power reception device according to one embodiment of the present invention.

FIG. 3 shows a structure of the power reception device 100 provided with the power receiving unit 103 which receives power and a transmission/reception unit 104 which is used for communication with the power transmission device.

The power receiving signal S0 output from the power receiving unit 103 is output to the clock generation unit 113 in the power reception control device 101 and the rectifier circuit 105.

Further, the reception signal received by the transmission/reception unit 104 is input to the interface 121 in the communication control unit 120, demodulated by the interface 121, and then output to the arithmetic unit 123. Further, the transmission signal generated in the arithmetic unit 123 is modulated by the interface 121 and transmitted to the power transmission device through the transmission/reception unit 104.

Such a structure is preferable since the power receiving signal S0 having relatively large amplitude is not directly input to the interface 121 and therefore an element such as a transistor or a capacitor which has relatively low withstand voltage can be used for the interface 121.

The above is the description of the modification example.

This embodiment can be combined with any of the other embodiments disclosed in this specification as appropriate.

(Embodiment 2)

In this embodiment, a structural example of the power source control unit 111 described in Embodiment 1 will be described with reference to drawings.

Figure 4A:
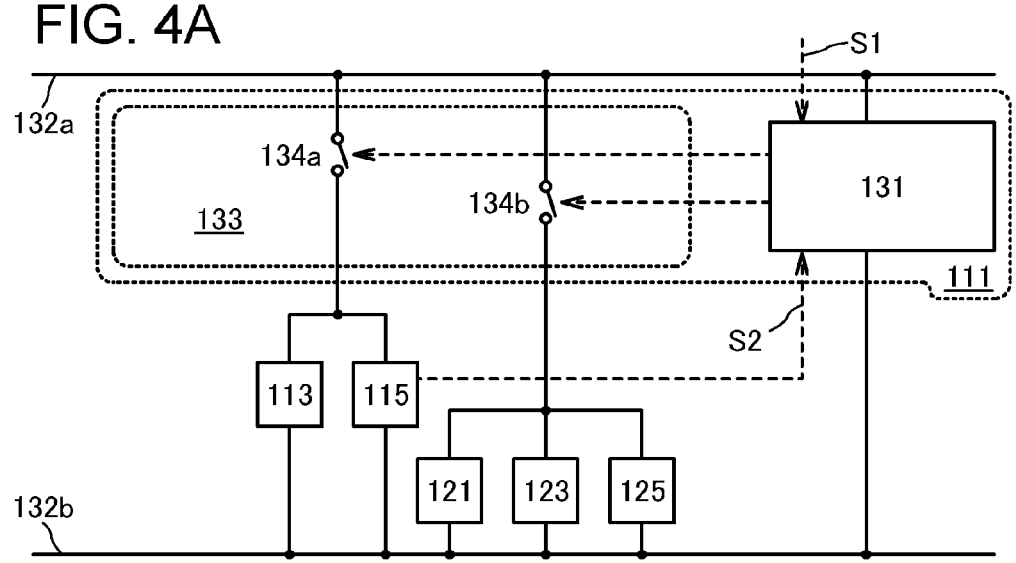
FIGS. 4A and 4B each illustrate a structural example of a power source control unit according to one embodiment of the present invention.

The power source control unit 111 illustrated in FIG. 4A includes a power controller 131 and a power switch 133. Further, wirings 132a and 132b which have different fixed potentials are electrically connected to the power source control unit 111.

One of a high-level potential and a low-level potential is applied to the wiring 132a. Further, the other of the high-level potential or the low-level potential is applied to the wiring 132b. Here, a potential difference between the high-level potential and the low-level potential corresponds to each of the power supply voltage $V_{DD}1$ and the power supply voltage $V_{DD}2$.

Note that here, the power supply voltage $V_{DD}1$ and the power supply voltage $V_{DD}2$ have the same voltage value; however, in the case where they have different voltage values, a wiring supplied with a potential which is different from the high-level potential and the low-level potential is additionally provided, and a potential difference of two of potentials applied to the respective three wirings is used as the power supply voltage.

The power switch 133 includes a switch 134a and a switch 134b.

A first terminal of the switch 134a is electrically connected to the wiring 132a and a second terminal of the switch 134a is electrically connected to the clock generation unit 113 and the counter unit 115. A first terminal of the switch 134b is electrically connected to the wiring 132a and a second terminal of the switch 134b is electrically connected to the interface 121, the arithmetic unit 123, and the memory unit 125. Each of the clock generation unit 113, the counter unit 115, the interface 121, the arithmetic unit 123, and the memory unit 125 is electrically connected to the wiring 132b.

The power controller 131 controls whether to turn on or off the switch 134a and the switch 134b in accordance with the detection signal S1 input from the power receiving detection unit 117 and the signal S2 input from the counter unit 115.

When the switch 134a is in an on state, a potential applied to the wiring 132a is input to the clock generation unit 113 and the counter unit 115 through the switch 134a. Thus, the power supply voltage $V_{DD}2$ is supplied to the clock generation unit 113 and the counter unit 115. On the other hand, when the switch 134a is in an off state, either of the high-level potential and the low-level potential is not input to the clock generation unit 113 and the counter unit 115; thus, the supply of the power supply voltage $V_{DD}2$ is stopped. That is, the clock generation unit 113 and the counter unit 115 are each in a deactivated state.

Similarly, when the switch 134b is in an on state, the power supply voltage $V_{DD}1$ is supplied to the interface 121, the arithmetic unit 123, and the memory unit 125. On the other hand, when the switch 134b is in an off state, the supply of the power supply voltage $V_{DD}1$ to the interface 121, the arithmetic unit 123, and the memory unit 125 is stopped.

When the power source control unit 111 has such a structure, supply of the power supply voltage to each unit and a stop of the supply of the power supply voltage can be surely controlled.

Here, when the power switch 133 is positioned on a wiring side where a high-level potential is applied (also referred to as a high side) compared to other units supplying power supply voltage, problems such that an element constituting each unit is suddenly short-circuited and the like can be suppressed since the high-level potential is not applied to each unit at the time when the supply of the power supply voltage is stopped. On the other hand, when the power switch 133 is positioned on a wiring side where a low-level potential is applied (also referred to as a low side) compared to other units supplying power supply voltage, the start can be promptly performed when the supply of power supply voltage is resumed from the state where the supply of the power supply voltage is stopped; thus, high-speed operation is achieved.

Figure 4B:
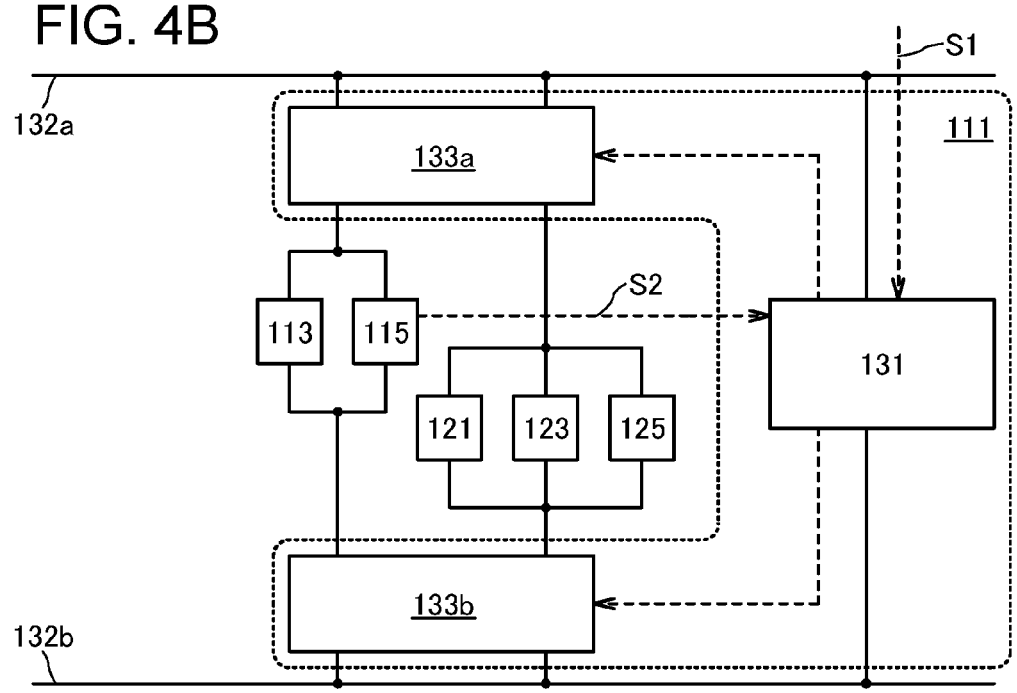

Further, as illustrated in FIG. 4B, two power switches (power switches 133a and 133b) may be positioned on a high side and a low side. With this structure, either potential is not applied to each unit when the supply of the power supply voltage is stopped. As a result, power consumption caused by leakage of an element can be further reduced.

Also in that case, when the supply of the power supply voltage is started or resumed, it is preferable that the pair of switches in the power switch 133a and the power switch 133b not be turned on at the same time, and be turned on at different times, because generation of flow-through current at the start of the supply of the power supply voltage can be suppressed.

This embodiment can be combined with any of the other embodiments disclosed in this specification as appropriate.

(Embodiment 3)

In this embodiment, a structural example of a memory device applicable to the memory unit 125 in the power reception control device 101 which is described in Embodiment 1 will be described with reference to drawings.

As described, as a structure of the memory unit 125, a structure provided with both a volatile memory element capable of high-speed operation and a memory element (nonvolatile memory element) capable holding data even after supply of power supply voltage is stopped is preferable.

At this time, a structure in which a memory device provided with a plurality of volatile memory elements and a memory device provided with a plurality of nonvolatile memory elements are separately provided and are electrically connected so as to transfer data may be employed. In that case, it is necessary to separately provide driving circuits which drive the respective memory devices and to provide a connection wiring which electrically connects each of the memory devices. Thus, it is difficult to decrease the circuit scale of the memory unit and the installation area occupied by the memory unit. Further, since each of the memory devices is required to be driven, it is difficult to reduce the power consumption.

Thus, it is preferable that a unit memory circuit which stores one-bit data (in the case where the memory element can store three or more levels of data, data that is more than one bit of data is stored) include both a volatile memory element and a nonvolatile memory element, data transfer be possible between the memory element, and a driving circuit and a wiring be shared.

A structural example of a shift register provided with a unit memory circuit including a volatile memory element capable of high-speed operation and a nonvolatile memory element capable of saving data stored in the volatile memory element before the supply of the power supply voltage is stopped will be described below.

[Structural Example 1]

Figure 5:
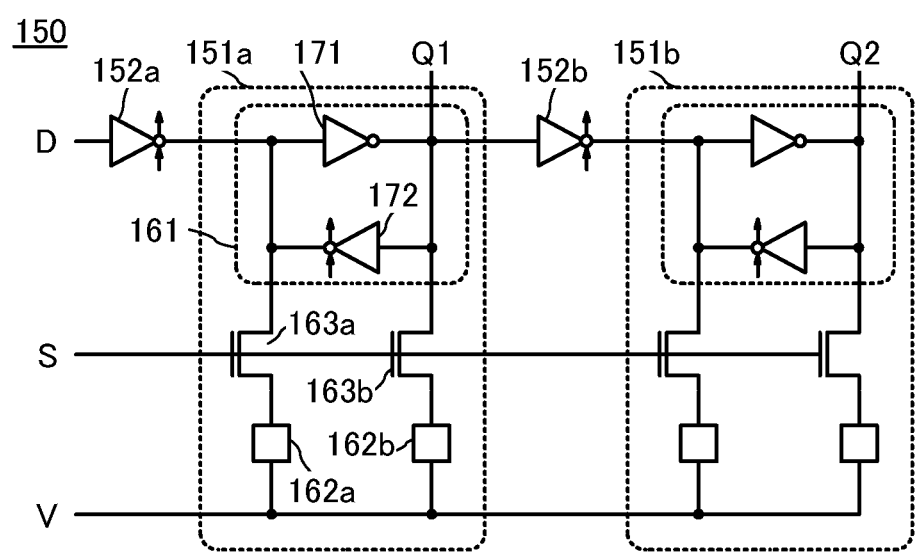
FIG. 5 illustrates a structural example of a shift register according to one embodiment of the present invention.

FIG. 5 is a circuit diagram of the shift register 150 described in this structural example. A structural example of a two-bit shift register is illustrated; however, it is needless to say that application of one embodiment of the present invention to a structure including three or more bit data is readily conceived by those skilled in the art.

In the shift register 150, an inverter 152a, a unit memory circuit 151a, an inverter 152b, and a unit memory circuit 151b are connected in series in this order. Here, the unit memory circuit 151a has a structure similar to that of the unit memory circuit 151b. Further, a data signal D is input to an input terminal of the inverter 152a.

The inverter functions as a logic element which inverts logic (also referred to as a NOT gate). For example an inverter circuit, a clocked inverter circuit, or the like can be used as the logic element. In this structural example, a clocked inverter is used for each of the inverters 152a, 152b, and the inverter 172; however, the structure is not limited to this.

The unit memory circuit 151a includes a first memory element 161, second memory elements 162a and 162b, and switches 163a and 163b.

The first memory element 161 includes an inverter 171 and the inverter 172. An input terminal of the inverter 171 is electrically connected to the output terminal of the inverter 152a, an output terminal of the inverter 172, and a first terminal of the switch 163a, and an output terminal of the inverter 171 is electrically connected to an input terminal of the inverter 152b, an input terminal of the inverter 172, and a first terminal of the switch 163b.

Here, a node electrically connected to the output terminal of the inverter 171 corresponds to an output node of the unit memory circuit 151a and outputs output data Q1. Similarly, an output node of the unit memory circuit 151b outputs output data Q2.

A second terminal of the switch 163a is electrically connected to a first terminal of the second memory element 162b. A second terminal of the switch 163b is electrically connected to a first terminal of the second memory element 162b. A potential V is applied to each of the second memory elements 162a and 162b.

A control signal S is input to each gate of the switches 163a and 163b. By the control signal S, an on state or an off state of the switches 163a and 163b is controlled.

For the second memory elements 162a and 162b, a nonvolatile memory element utilizing change in conductivity can be used. For example, it is possible to use a magnetic tunnel junction (MTJ) element which is used for an MRAM, an element utilizing an effect of a colossal electrode-resistance (CER) change which is used for a ReRAM, or the like.

Next, operation of the shift register 150 will be described.

First, a normal operation at the time when power supply voltage is supplied will be described. At this time, as the control signal S, a signal which turns off the switches 163a and 163b is input. Thus, in each of the unit memory circuits, the second memory element is electrically isolated, so that the shift register 150 can be used as a shift register only including an inverter. As a result, writing and reading operation can be performed at extremely high speed.

Next, before the supply of the power supply voltage is stopped, the state of the first memory element 161 at that point is stored in the second memory elements 162a and 162b.

In particular, a signal which turns on the switches 163a and 163b is input as the control signal S. Thus, information is written in the second memory element 162a in accordance with a potential difference between a potential of a node to which the input terminal of the inverter 171 is connected and the potential V. Similarly, information is written in the second memory element 162b in accordance with a potential difference between a potential of the node to which the output terminal of the inverter 171 is connected and the potential V. At this time, either of the second memory elements 162a and 162b is in a conduction state, and the other is in a non-conduction state.

Next, the supply of the power supply voltage is stopped. Here, the second memory elements 162a and 162b are maintained in the above-described state.

After the supply of the power supply voltage is resumed, a signal for turning on the switches 163a and 163b is input as the control signal S. Here, just after the supply of the power supply voltage is resumed, the first memory element 161 is in a variable state. However, by inputting the potential V to the input terminal of the inverter 171 or the input terminal of the inverter 172 through an element in a conduction state of the second memory elements 162a and 162b, the first memory element 161 returns to the state the same as that before the supply of the power supply voltage is stopped.

With such operation, high-speed operation can be achieved when power supply voltage is supplied, and information stored in the volatile memory element before the supply of power supply voltage is stopped can be saved in the nonvolatile memory element.

The above is the description of this structure example.

[Structural Example 2]

In this structural example, a structural example of a shift register will be described. In the shift register, a memory element in which supply, holding, and release of electric charge to, in, and from a capacitor or a floating node are controlled by a transistor which has small off-state current is used as the second memory element in Structural Example 1.

Figure 6A:
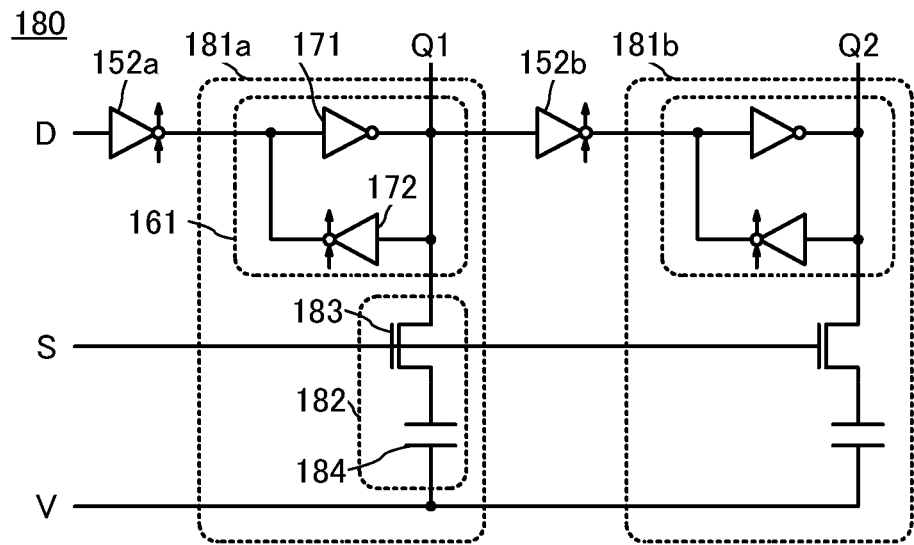
FIGS. 6A and 6B each illustrate a structural example of a shift register according to one embodiment of the present invention.

FIG. 6A illustrates a circuit diagram of a shift register 180 described in this structural example. The shift register 180 is the same as the shift register 150 described in Structural Example 1 except that the structure of the second memory element is different.

The shift register 180 includes a second memory element 182 instead of the switches 163a and 163b and the second memory elements 162a and 162b in the shift register 150.

The second memory element 182 includes a transistor 183 and a capacitor 184. A first terminal of the second transistor 183 is electrically connected to the output terminal of the inverter 171 and a second terminal of the second transistor 183 is electrically connected to a first terminal of the capacitor 184. Further, the control signal S is input to a gate of the transistor 183, and the potential V is input to a second terminal of the capacitor 184.

It is preferable that off-state current of the transistor 183 be extremely low. The low off-state current of the transistor 183 leads to a reduction in the amount of electric charge leaked through the transistor 183, thereby ensuring a long period during which data is held in the second memory element 182. A transistor whose channel formation region contains an oxide semiconductor having a wide band gap has extremely low off-state current, and thus is preferably used as the transistor 183.

The transistor 183 can have two gate electrodes above and below a semiconductor film including an oxide semiconductor. The control signal S can be input to one of the gate electrodes, and a signal for controlling threshold voltage can be input to the other of the gate electrodes. The signal for controlling threshold voltage may be a signal with a fixed potential. Alternatively, the two gate electrodes provided above and below the semiconductor film may be connected to each other and supplied with the control signal S. The threshold voltage of the transistor 183 can be controlled by a signal input to the other of the gate electrodes of the transistor 183. The off-state current of the transistor 183 can be further reduced by controlling the threshold voltage.

In this structural example, the transistor 183 is an n-channel transistor.

As the potential V input to the second terminal of the capacitor 184, for example, a fixed potential such as a high-level potential or a low-level potential can be used. In this structural example, a low-level potential is used as the potential V.

Next, operation of the shift register 180 will be described.

First, in a normal operation at the time when the power supply voltage is supplied, a signal (a low-level potential) for turning off the transistor 183 is input as the control signal S. Thus, similarly to Structural Example 1, the shift register 180 operates as a shift register only including an inverter.

Next, before the supply of the power supply voltage is stopped, a signal for tuning on the transistor 183 is input as the control signal S. Thus, a potential of the node to which the output terminal of the inverter 171 is connected is applied to the first terminal of the capacitor 184, and electric charge is accumulated between a pair of electrodes of the capacitor 184 in accordance with the potential difference between the potential and the potential V.

After that, a signal for turning off the transistor 183 is applied as the control signal S, so that the potential of a node connected to the first terminal of the capacitor 184 is kept.

Next, the supply of the power supply voltage is stopped. Here, a signal for turning off the transistor 183 is applied as the control signal S at all times. Alternatively, a low-level potential that is equal to the potential V may be applied as the control signal S. The transistor 183 has extremely low off-state current; thus, by maintaining the off state of the transistor 183, a decrease in the electric charge accumulated in the capacitor 184 through the transistor 183 is prevented even when the supply of the power supply voltage is stopped. Consequently, information stored in the second memory element 182 is held.

After the supply of the power supply voltage is resumed, a signal for turning on the transistor 183 is input as the control signal S. At this time, before the supply of the power supply voltage is stopped, a high-level potential is applied to the input terminal of the inverter 172 in the case where the potential applied to the first terminal of the capacitor 184 is a high-level potential. In the case where the potential is a low-level potential, a low-level potential is applied to the input terminal of the inverter 172. As described above, the first memory element 161 can return to the state the same as that before the supply of the power supply voltage is stopped.

Here, as described in Structural Example 1, when a memory element utilizing change in conductivity of an element is applied to the second memory element, information on one type of potential (the potential V in Structural Example 1) is only stored. For that reason, a pair of memory elements connected to the input terminals of the inverters 171 and 172 needs to be provided so as to determine the state of the first memory element 161 after the supply of the power supply voltage is resumed. However, since information on two types of potentials of a high-level potential and a low-level potential can be stored in the second memory element described in this structural example, only one memory element connected to the input terminal of either of the inverter 171 and the inverter 172 is provided, which leads to simplification of the circuit structure.

Figure 6B:
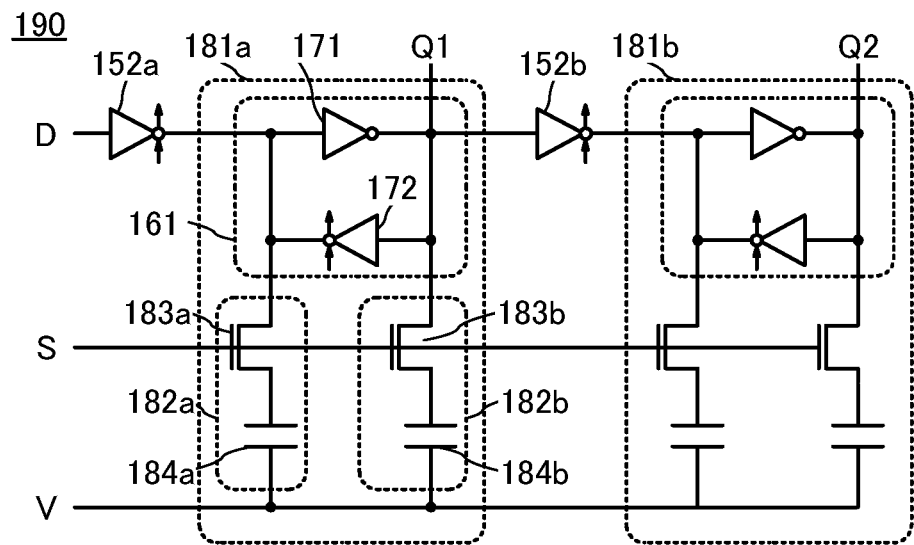

Further, as shown in the shift register 190 in FIG. 6B, a structure in which a pair of second memory elements (second memory elements 182a and 182b) is connected to the input terminals of the inverters 171 and 172 may be employed. Such a structure is suitable for high speed operation since a period until the state of the first memory element 161 is determined at the time when the supply of the power supply voltage is resumed can be shortened.

The case where the transistor 183 is turned off in the normal operation during which the power supply voltage is supplied is described above; however, the transistor 183 may be turned on in the normal operation.

In that case, as the potential of the first terminal of the capacitor 184, a potential of the output data Q1 of a unit memory circuit 181a is maintained at all times. Thus, when the supply of the power supply voltage is stopped, the capacitor 184 does not need to be charged or discharged and only the transistor 183 needs to be turned off, so that high-speed operation is realized.

Further, the capacitance of the capacitor 184 needs to be a value with which a potential sufficient to invert the outputs of the inverters 172 and 152b can be applied to the nodes to which these input terminals are connected. Specifically, the capacitance of the capacitor 184 may be equal to the respective gate capacitances of the input portions of the inverters 172 and 152b. Thus, current needed for charge and discharge of the capacitor 184 can be made extremely small, so that the shift register 180 can be operated at high speed even when the transistor 183 is turned on all the time in the normal operation as described above.

Note that in the unit memory circuit 181a including the second memory element in which supply, holding, and discharge of electric charge to, in, and from the capacitor or the floating node is controlled using a transistor with extremely low off-state current as described above, the amount of power consumed by data saving and restoring (overhead power consumption) is smaller than that in a shift register including an MRAM or the like as the second memory element. Specifically, a current necessary for data writing in an MRAM is said to be 50 μA to 500 μA. On the other hand, in the unit memory circuit 181a described in this structural example, a current necessary for data writing can be approximately 1/100 that of an MRAM because data is saved by supply of electric charge to the capacitor 184. As a result, a power shut-off time during which the overhead power consumption and power cut by power shut-off become equal in amount, that is, a break even time (BET) can be shorter in the unit memory circuit 181a described in this structural example than in a unit memory circuit including an MRAM. Consequently, the power consumption of the power reception control device 101 can be reduced.

The above is the description of this structure example.

[Modification Example]

Here, in the case where an FeRAM element is used as the second memory element, a circuit structure described in this structural example can be used. In that case, the circuit structure can be realized with the use of a ferroelectric as a dielectric of the capacitor 184 (or the capacitors 184a and 184b). Note that in the case of using an FeRAM, it is not necessary to use a transistor with extremely low off-state current as the transistor 183 (or the transistors 183a and 183b).

This embodiment can be combined with any of the other embodiments disclosed in this specification as appropriate.

(Embodiment 4)

In this embodiment, a transistor with an extremely low off-state current in which an oxide semiconductor is used for a semiconductor layer where a channel is formed, and an example of applying the transistor to the above embodiment will be described.

An oxide semiconductor has a high energy gap of 3.0 eV or more. A transistor including an oxide semiconductor layer obtained by processing of an oxide semiconductor in an appropriate condition and a sufficient reduction in carrier density of the oxide semiconductor can have much lower leakage current between a source and a drain in an off state (off-state current) than a conventional transistor including silicon.

In the case where the transistor including an oxide semiconductor is used as the memory unit 125, it is preferable that another element included in the memory unit 125 be formed in a CMOS process, the transistor be stacked over the element, and that these elements be electrically connected to each other through a contact plug. With such a structure, the area occupied by the controller can be reduced.

An oxide semiconductor to be used preferably includes at least indium (In) or zinc (Zn). In particular, In and Zn are preferably contained. As a stabilizer for reducing variation in electric characteristics of a transistor using the oxide semiconductor, gallium (Ga) is preferably additionally contained. Tin (Sn) is preferably contained as a stabilizer. In addition, as a stabilizer, one or more selected from hafnium (Hf), zirconium (Zr), titanium (Ti), scandium (Sc), yttrium (Y), and lanthanoid element (such as cerium (Ce), neodymium (Nd), or gadolinium (Gd), for example) is preferably contained.

As the oxide semiconductor, for example, any of the following can be used: indium oxide, tin oxide, zinc oxide, an In—Zn-based oxide, a Sn—Zn-based oxide, an Al—Zn-based oxide, a Zn—Mg-based oxide, a Sn—Mg-based oxide, an In—Mg-based oxide, an In—Ga-based oxide, an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—Zr—Zn-based oxide, an In—Ti—Zn-based oxide, an In—Sc—Zn-based oxide, an In—Y—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide.

Here, an "In—Ga—Zn-based oxide" means an oxide containing In, Ga, and Zn as its main components and there is no particular limitation on the ratio of In:Ga:Zn. The In—Ga—Zn-based oxide may contain a metal element other than the In, Ga, and Zn.

Alternatively, a material represented by $InMO_3(ZnO)_m$ (m>0 is satisfied, and m is not an integer) may be used as an oxide semiconductor. Note that M represents one or more metal elements selected from Ga, Fe, Mn, and Co, or the above-described element as a stabilizer. Alternatively, as the oxide semiconductor, a material expressed by a chemical formula, $In_2SnO_5(ZnO)_n$ (n>0, n is an integer) may be used.

For example, an In—Ga—Zn-based oxide with an atomic ratio where In:Ga:Zn=1:1:1, In:Ga:Zn=3:1:2, or In:Ga:Zn=2:1:3, or the like, or an oxide whose atomic ratio is in the neighborhood of the above compositions can be used.

An oxide semiconductor film which can be used for a semiconductor layer of a transistor may be either single crystal or non-single-crystal. The non-single-crystal state is, for example, structured by at least one of c-axis aligned crystal (CAAC), polycrystal, microcrystal, and an amorphous part. The density of defect states of an amorphous part is higher than those of microcrystal and CAAC. The density of defect states of microcrystal is higher than that of CAAC.

Note that an oxide semiconductor including CAAC is referred to as a CAAC-OS (c-axis aligned crystalline oxide semiconductor).

The oxide semiconductor film is preferably a CAAC-OS film.

For example, the oxide semiconductor film may include microcrystal. Note that an oxide semiconductor including microcrystal is referred to as a microcrystalline oxide semiconductor. A microcrystalline oxide semiconductor film includes microcrystal (also referred to as nanocrystal) with a size greater than or equal to 1 nm and less than 10 nm, for example.

For example, the oxide semiconductor film may include an amorphous part. Note that an oxide semiconductor including an amorphous part is referred to as an amorphous oxide semiconductor. An amorphous oxide semiconductor film, for example, has disordered atomic arrangement and no crystalline component. Alternatively, an amorphous oxide semiconductor film is, for example, absolutely amorphous and has no crystal part.

Note that the oxide semiconductor film may be a mixed film including any of a CAAC-OS, a microcrystalline oxide semiconductor, and an amorphous oxide semiconductor. The mixed film, for example, includes a region of an amorphous oxide semiconductor, a region of a microcrystalline oxide semiconductor, and a region of a CAAC-OS. Further, the mixed film may have a stacked structure including a region of an amorphous oxide semiconductor, a region of a microcrystalline oxide semiconductor, and a region of a CAAC-OS, for example.

The oxide semiconductor film may be in a single-crystal state, for example.

An oxide semiconductor film preferably includes a plurality of crystal parts. In each of the crystal parts, a c-axis is preferably aligned in a direction parallel to a normal vector of a surface where the oxide semiconductor film is formed or a normal vector of a surface of the oxide semiconductor film. Note that, among crystal parts, the directions of the a-axis and the b-axis of one crystal part may be different from those of another crystal part. An example of such an oxide semiconductor film is a CAAC-OS film.

A CAAC-OS film is described below.

In most cases, the crystal part of the CAAC-OS film fits inside a cube whose one side is less than 100 nm. In an image obtained with a transmission electron microscope (TEM), a boundary between an amorphous part and a crystal part and a boundary between crystal parts in the CAAC-OS film are not clearly detected. Further, with the TEM, a grain boundary in the CAAC-OS film is not clearly found. Thus, in the CAAC-OS film, a reduction in electron mobility, due to the grain boundary, is suppressed.

In each of the crystal parts included in the CAAC-OS film, for example, a c-axis is aligned in a direction parallel to a normal vector of a surface where the CAAC-OS film is formed or a normal vector of a surface of the CAAC-OS film. Further, in each of the crystal parts, metal atoms are arranged in a triangular or hexagonal configuration when seen from the direction perpendicular to the a-b plane, and metal atoms are arranged in a layered manner or metal atoms and oxygen atoms are arranged in a layered manner when seen from the direction perpendicular to the c-axis. Note that, among crystal parts, the directions of the a-axis and the b-axis of one crystal part may be different from those of another crystal part. In this specification, a term "perpendicular" includes a range from 80° to 100°, preferably from 85° to 95°. In addition, a term "parallel" includes a range from −10° to 10°, preferably from −5° to 5°.

In the CAAC-OS film, distribution of crystal parts is not necessarily uniform. For example, in the formation process of the CAAC-OS film, in the case where crystal growth occurs from a surface side of the oxide semiconductor film, the proportion of crystal parts in the vicinity of the surface of the oxide semiconductor film is higher than that in the vicinity of the surface where the oxide semiconductor film is formed in some cases. Further, when an impurity is added to the CAAC-OS film, the crystal part in a region to which the impurity is added becomes amorphous in some cases.

Since the c-axes of the crystal parts included in the CAAC-OS film are aligned in the direction parallel to a normal vector of a surface where the CAAC-OS film is formed or a normal vector of a surface of the CAAC-OS film, the directions of the c-axes may be different from each other depending on the shape of the CAAC-OS film (the cross-sectional shape of the surface where the CAAC-OS film is formed or the cross-sectional shape of the surface of the CAAC-OS film). Note that the film deposition is accompanied with the formation of the crystal parts or followed by the formation of the crystal parts through crystallization treatment such as heat treatment. Hence, the c-axes of the crystal parts are aligned in the direction parallel to a normal vector of the surface where the CAAC-OS film is formed or a normal vector of the surface of the CAAC-OS film.

There are three methods for forming a CAAC-OS film when the CAAC-OS film is used as the oxide semiconductor film.

The first method is to form an oxide semiconductor film at a temperature higher than or equal to 200° C. and lower than or equal to 600° C. to form, in the oxide semiconductor film, crystal parts in which the c-axes are aligned in the direction parallel to a normal vector of a surface where the oxide semiconductor film is formed or a normal vector of a surface of the oxide semiconductor film.

The second method is to form an oxide semiconductor film with a small thickness and then heat it at a temperature higher than or equal to 200° C. and lower than or equal to 700° C., to form, in the oxide semiconductor film, crystal parts in which the c-axes are aligned in the direction parallel to a normal vector of a surface where the oxide semiconductor film is formed or a normal vector of a surface of the oxide semiconductor film.

The third method is to form a first oxide semiconductor film with a small thickness, then heat it at a temperature higher than or equal to 200° C. and lower than or equal to 700° C., and form a second oxide semiconductor film, to form, in the oxide semiconductor film, crystal parts in which the c-axes are aligned in the direction parallel to a normal vector of a surface where the oxide semiconductor film is formed or a normal vector of a surface of the oxide semiconductor film.

In the case where a CAAC-OS film is deposited by a sputtering method, a substrate temperature in the deposition is preferably high. For example, an oxide film is deposited at a substrate heating temperature from 100° C. to 600° C., preferably from 200° C. to 500° C., further preferably from 150° C. to 450° C., whereby a CAAC-OS film can be deposited.

Power used in a sputtering method is preferably supplied from a direct-current (DC) source. Note that a radio frequency (RF) power source or an alternating-current (AC) power source can be used. Note that it is difficult to use an RF power source for a sputtering apparatus which is capable of performing deposition onto a large-sized substrate. In addition, a DC power source is preferred to an AC power source from the viewpoint below.

In the case where an In—Ga—Zn—O compound target is used as a sputtering target, an In—Ga—Zn—O compound target in which InOx powder, GaOy powder, and ZnOz powder are mixed in the molar ratio of 2:2:1, 8:4:3, 3:1:1, 1:1:1, 4:2:3, 3:1:2, 3:1:4, 1:6:4, 1:6:9, or the like is preferably used, for example. x, y, and z are any positive numbers. Note that a sputtering target may be polycrystalline.

Alternatively, with use of magnetron, plasma area near a sputtering target can be increased in density due to a magnetic field. For example, in a magnetron sputtering apparatus, a magnetic assembly is located in the back of the sputtering target and a magnetic field is generated in the front of the sputtering target. When the sputtering target is sputtered, the magnetic field traps ionized electrons and secondary electrons generated by the sputtering. The electrons trapped in this way enhance the odds of collision with an inert gas, such as a rare gas, in the deposition chamber, thereby increasing the plasma density. Thus, the deposition rate can be increased without significantly increasing the temperature of an element formation layer.

In the case where a CAAC-OS film is deposited by a sputtering method, for example, impurities (e.g., hydrogen, water, carbon dioxide, and nitrogen) existing in a deposition chamber of a sputtering apparatus is preferably reduced. Further, the concentration of impurities in a deposition gas is preferably reduced. For example, as a deposition gas such as an oxygen gas or an argon gas, a highly purified gas having a dew point of −40° C. or lower, preferably −80° C. or lower, still preferably −100° C. or lower is used, thereby suppressing entry of impurities into a CAAC-OS film.

In the case where a CAAC-OS film is deposited by a sputtering method, it is preferable to suppress plasma damage when the deposition is performed by increasing the oxygen percentage in the deposition gas and optimizing electric power. For example, the oxygen percentage in the deposition gas is preferably 30 vol % or higher, still preferably 100 vol %.

In the case where a CAAC-OS film is deposited by a sputtering method, heat treatment may be performed in addition to the substrate heating when the deposition is performed. By the heat treatment, the impurity concentration in the oxide semiconductor film can be reduced, for example.

The heat treatment is performed at higher than or equal to 350° C. and lower than a strain point of the substrate, or may be performed at higher than or equal to 350° C. and lower than or equal to 450° C. Note that the heat treatment may be performed more than once.

There is no particular limitation on a heat treatment apparatus to be used for the heat treatment, and a rapid thermal annealing (RTA) apparatus such as a gas rapid thermal annealing (GRTA) apparatus or a lamp rapid thermal annealing (LRTA) apparatus may be used. Alternatively, another heat treatment apparatus such as an electric furnace may be used.

As described in the above process, an impurity concentration in the oxide semiconductor film is reduced by preventing entry of hydrogen, water, or the like into the film during the deposition. The impurity concentration can be reduced by removing hydrogen, water, or the like contained in the oxide semiconductor film through the heat treatment after the deposition of the oxide semiconductor film. After that, oxygen is supplied to the oxide semiconductor film to repair oxygen defects, thereby highly purifying the oxide semiconductor film. Moreover, oxygen may be added to the oxide semiconductor film.

With the use of the CAAC-OS film in a transistor, change in electric characteristics of the transistor due to irradiation with visible light or ultraviolet light is small. Thus, the transistor has high reliability.

The above is the description of the CAAC-OS film.

After formation of the oxide semiconductor film, it is preferable that dehydration treatment (dehydrogenation treatment) be performed to remove hydrogen or moisture from the oxide semiconductor film so that the oxide semiconductor film is highly purified to contain impurities as little as possible, and that oxygen be added to the oxide semiconductor film to fill oxygen vacancies increased by the dehydration treatment (dehydrogenation treatment). In this specification and the like, supplying oxygen to an oxide semiconductor film may be expressed as oxygen adding treatment or treatment for making the oxygen content of an oxide semiconductor film be in excess of that in the stoichiometric composition may be expressed as treatment for making an oxygen-excess state.

In this manner, hydrogen or moisture is removed from the oxide semiconductor film by dehydration treatment (dehydrogenation treatment) and oxygen vacancies therein are filled by oxygen adding treatment, whereby the oxide semiconductor film can be turned into an i-type (intrinsic) or substantially i-type oxide semiconductor film. Such a highly purified oxide semiconductor film includes extremely few (close to zero) carriers derived from a donor, and the carrier concentration thereof is lower than $1\times10^{17}/cm^3$, preferably lower than $1\times10^{15}/cm^3$, further preferably lower than $1\times10^{14}/cm^3$, still further preferably lower than $1\times10^{13}/cm^3$, still more preferably lower than $1\times10^{12}/cm^3$, still more further preferably lower than $1\times10^{11}/cm^3$, still more further preferably lower than $1.45\times10^{10}/cm^3$.

The transistor including the oxide semiconductor layer which is highly purified by sufficiently reducing the hydrogen concentration, and in which defect levels in the energy gap due to oxygen vacancies are reduced by sufficiently supplying oxygen can achieve excellent off-state current characteristics. For example, the off-state current (per unit channel width (1 μm) here) at room temperature (25° C.) is 100 zA (1 zA (zeptoampere) is $1\times10^{-21}$ A) or lower, preferably 10 zA or lower. The off-state current at 85° C. is 100 zA ($1\times10^{-19}$ A) or less, preferably 10 zA ($1\times10^{-20}$ A) or less. In this manner, the transistor which has extremely favorable off-state current characteristics can be obtained with the use of an i-type (intrinsic) or substantially i-type oxide semiconductor layer.

By using such a transistor, a nonvolatile memory element can be realized; overheads and the break-even time can be reduced; and power consumption of the power reception control device 101 can be reduced.

Next, an example of a structure of a unit memory circuit in which a transistor including an oxide semiconductor in a semiconductor layer where a channel is formed is used as the transistor 183 in FIG. 6A is described. Here, an example is described where the transistor 183 and the capacitor 184 are stacked over another element included in the first memory element 161 that is formed through a CMOS process.

Figure 7:
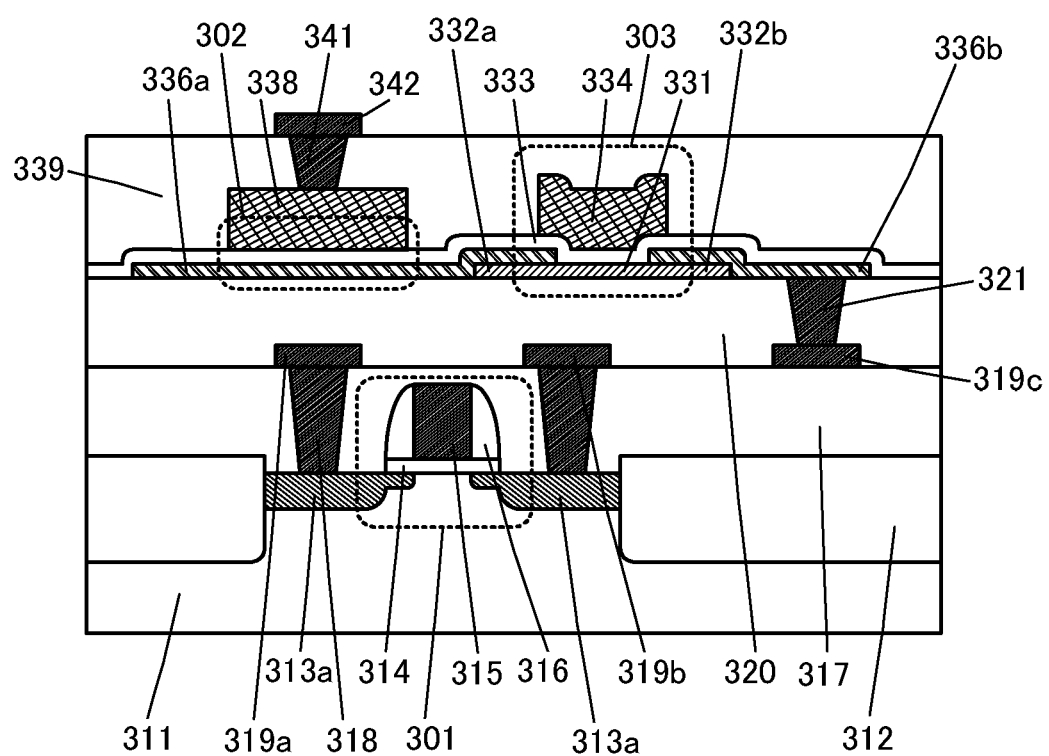
FIG. 7 illustrates a structural example of a memory unit according to one embodiment of the present invention.

In a cross-sectional schematic view in FIG. 7, a transistor including an oxide semiconductor layer where a channel is formed and which contains a semiconductor belonging to Group 14 of the periodic table (e.g., silicon) and a transistor including an oxide semiconductor layer where a channel is formed are formed. In this case, the transistor including an oxide semiconductor layer in which a channel is formed can be stacked over the transistor including a semiconductor layer which contains a semiconductor belonging to Group 14 of the periodic table (e.g., silicon). The transistor including a semiconductor layer which contains a semiconductor belonging to Group 14 of the periodic table (e.g., silicon) can be applied to the transistors included in the inverters 171 and 172 and the inverters 152a and 152b, and the like in FIGS. 6A and 6B, for example.

FIG. 7 illustrates a transistor 301 included in the input portion of the inverter 172, and a capacitor 302 and a transistor 303 which are electrically connected to the transistor 301 and are provided over the transistor 301. Here, the transistor 303 and the capacitor 302 correspond to the transistor 183 and the capacitor 184 in FIG. 6A, respectively.

In FIG. 7, the transistor 301 including a semiconductor layer which contains a semiconductor belonging to Group 14 of the periodic table (e.g., silicon), the transistor 303 including an oxide semiconductor layer where a channel is formed, and the capacitor 302 are formed using a semiconductor layer 311, an insulating layer 314, a conductive layer 315, an insulating layers 316, an insulating layer 317, connection layers 318, a conductive layer 319a, a conductive layer 319b, a conductive layer 319c, an insulating layer 320, a connection layer 321, a semiconductor layer 331, an insulating layer 333, a conductive layer 334, a conductive layer 336a, a conductive layer 336b, a conductive layer 338, an insulating layer 339, a connection layer 341, a conductive layer 342.

The semiconductor layer 311 includes a region 313a and a region 313b. In addition, adjacent transistors are electrically isolated by insulating layers 312 in some regions of the semiconductor layer 311.

For example, a semiconductor substrate can be used as the semiconductor layer 311. Alternatively, a semiconductor layer over a different substrate can be used as the semiconductor layer 311.

The region 313a and the region 313b are spaced apart from each other, and a dopant imparting n-type or p-type conductivity is added to the region 313a and the region 313b. The region 313a and the region 313b function as a source and drain regions of a p-channel transistor. For example, the region 313a and the region 313b are electrically connected to the conductive layer 319a and the conductive layer 319b, respectively, through the connection layers 318.

In the case where the transistor 301 is an n-channel transistor, an element imparting n-type conductivity is used as the dopant. In contrast, in the case where the transistor 301 is a p-channel transistor, an element imparting p-type conductivity is used as the dopant.

Note that low-concentration regions may be in parts of the region 313a and the region 313b. In that case, the low-concentration regions may be shallower than the rest of the region 313a and the region 313b; however, this embodiment is not limited thereto.

The insulating layer 314 is provided over a region of the semiconductor layer 311 that is between the insulating layers 312. The insulating layer 314 functions as a gate insulating layer of the transistor 301.

A layer of a material such as silicon oxide, silicon nitride, silicon oxynitride, silicon nitride oxide, aluminum oxide, aluminum nitride, aluminum oxynitride, aluminum nitride oxide, hafnium oxide, or an organic insulating material (e.g., polyimide or acrylic) can be used as the insulating layer 314, for example. The insulating layer 314 may be formed by stacking materials that can be used for the insulating layer 314.

The conductive layer 315 overlaps with the semiconductor layer 311 with the insulating layer 314 provided therebetween. A region of the semiconductor layer 311 that overlaps with the conductive layer 315 is a channel formation region of the transistor 301. The conductive layer 315 functions as a gate of the transistor 301.

A layer of a metal material such as molybdenum, magnesium, titanium, chromium, tantalum, tungsten, aluminum, copper, neodymium, or scandium or an alloy material containing the metal material as a main component can be used as the conductive layer 315, for example. The conductive layer 315 may be formed by stacking materials that can be used for the conductive layer 315.

The insulating layers 316 are provided over the insulating layer 314 and in contact with a pair of side surfaces of the conductive layer 315 that face each other.

The insulating layer 317 is provided over the conductive layer 315 and the insulating layers 316.

Each of the insulating layers 316 and 317 can be formed using any of the materials that can be used for the insulating layer 314, which may be the same as or different from the material used for the insulating layer 314. Alternatively, the insulating layers 316 or the insulating layer 317 can be formed by stacking materials that can be used for the insulating layers 316 and 317.

The connection layers 318 are provided to fill openings in the insulating layer 317 and are electrically connected to the region 313a and the region 313b.

The conductive layer 319a, the conductive layer 319b, and the conductive layer 319c are provided over the insulating layer 317. The conductive layer 319a is electrically connected to the region 313a through the connection layer 318. The conductive layer 319b is electrically connected to the region 313b through the connection layer 318. The conductive layer 319c is electrically connected to the conductive layer 315 through the connection layer 318 (not illustrated).

Each of the connection layer 318, the conductive layer 319a, the conductive layer 319b, and the conductive layer 319c can be formed using any of the materials that can be used for the conductive layer 315, which may be the same as or different from the material used for the conductive layer 315. Alternatively, each of the connection layer 318, the conductive layer 319a, the conductive layer 319b, and the conductive layer 319c can be formed by stacking materials that can be used for the connection layer 318, the conductive layer 319a, the conductive layer 319b, and the conductive layer 319c.

The insulating layer 320 is provided over the insulating layer 317, the conductive layer 319a, the conductive layer 319b, and the conductive layer 319c. The structure of the insulating layer 320 can be similar to that of the insulating layer 317.

The connection layer 321 is provided to fill an opening in the insulating layer 320 and is electrically connected to the conductive layer 319c. The structure of the connection layer 321 can be similar to that of the connection layer 318.

The semiconductor layer 331 is provided over the insulating layer 320. Any of the above-described materials can be used for the semiconductor layer 331.

A region to which a dopant is added may be provided for regions of the semiconductor layer 331 which overlap with the conductive layer 336a and the conductive layer 336b. One or more selected from the following can be used as the dopant: Group 15 elements (typical examples thereof are nitrogen (N), phosphorus (P), arsenic (As), and antimony (Sb)), boron (B), aluminum (Al), argon (Ar), helium (He), neon (Ne), indium (In), fluorine (F), chlorine (Cl), titanium (Ti), and zinc (Zn). Note that such a region is not necessarily provided.

The conductive layer 336a and the conductive layer 336b are spaced apart from each other and electrically connected to each other while being in contact with the semiconductor layer 331. The conductive layer 336a and the conductive layer 336b function as a source electrode and drain electrode of a transistor. The conductive layer 336b is electrically connected to the connection layer 321. The conductive layer 336a also functions as one of electrodes of the capacitor 302.

The conductive layers 336a and 336b can be formed using a metal selected from aluminum (Al), chromium (Cr), copper (Cu), tantalum (Ta), titanium (Ti), molybdenum (Mo), tungsten (W), neodymium (Nd), scandium (Sc), or the like; an alloy containing the above metal element; an alloy containing the above metal elements in combination; a nitride of the above metal element; or the like. Further, one or more metal elements selected from manganese (Mn), magnesium (Mg), zirconium (Zr), beryllium (Be), and the like may be used.

The insulating layer 333 can be provided over the semiconductor layer 331, the conductive layer 336a, and the conductive layer 336b. The insulating layer 333 functions as a gate insulating layer of the transistor. The insulating layer 333 also functions as a dielectric layer of the capacitor 302.

The insulating layer 333 can be formed using, for example, a single layer or a stacked layer using a material selected from aluminum nitride, aluminum oxide, aluminum nitride oxide, aluminum oxynitride, silicon nitride, silicon oxide, silicon nitride oxide, silicon oxynitride, tantalum oxide, or lanthanum oxide.

When a high-k material such as hafnium silicate (HfSi$_x$O$_y$), hafnium silicate to which nitrogen is added (HfSi$_x$O$_y$N$_z$), hafnium aluminate to which nitrogen is added (HfAl$_x$O$_y$N$_z$), hafnium oxide, or yttrium oxide is used as the insulating layer 333, gate leakage can be reduced by increasing the physical thickness of a gate insulating film without changing the substantial thickness (e.g., equivalent silicon oxide thickness) of the gate insulating film. Further, a stacked structure can be used in which a high-k material and one or more of silicon oxide, silicon nitride, silicon oxynitride, silicon nitride oxide, aluminum oxide, aluminum oxynitride, and gallium oxide are stacked.

The conductive layer 334 overlaps with the semiconductor layer 331 with the insulating layer 333 provided therebetween. The conductive layer 334 functions as a gate of the transistor. Further, it is preferable that the conductive layer 334 be provided so as to partially overlap with the conductive layers 336a and 336b.

The conductive layer 334 can be formed using a metal selected from aluminum (Al), chromium (Cr), copper (Cu), tantalum (Ta), titanium (Ti), molybdenum (Mo), tungsten (W), neodymium (Nd), or scandium (Sc); an alloy containing the above metal element; an alloy containing the above metal elements in combination; a nitride of the above metal element; or the like. Further, one or more metal elements selected from manganese (Mn), magnesium (Mg), zirconium (Zr), beryllium (Be) and the like may be used.

In addition, the conductive layer 334 may have a single-layer structure or a stacked structure of two or more layers. For example, a single-layer structure of aluminum containing silicon, a two-layer structure in which titanium is stacked over aluminum, a two-layer structure in which titanium is stacked over titanium nitride, a two-layer structure in which tungsten is stacked over titanium nitride, a two-layer structure in which tungsten is stacked over tantalum nitride, a two-layer structure in which Cu is stacked over a Cu—Mg—Al alloy, a three-layer structure in which titanium, aluminum, and titanium are stacked in this order, and the like can be given.

Alternatively, for the conductive layer 334, a light-transmitting conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added can be used. It is also possible to have a stacked-layer structure formed using the above light-transmitting conductive material and the above metal element.

Gallium oxide, indium gallium zinc oxide containing nitrogen, indium tin oxide containing nitrogen, indium gallium oxide containing nitrogen, indium zinc oxide containing nitrogen, tin oxide containing nitrogen, indium oxide containing nitrogen, or a metal nitride (e.g., InN or ZnN) may overlap with the conductive layer 334 and the semiconductor layer 331 and be in contact with the conductive layer 334 and the insulating layer 333.

These materials each have a work function of 5 eV or higher, preferably 5.5 eV or higher. The conductive layer 334 overlaps with the semiconductor layer 331 with the insulating layer 333 provided therebetween, so that the threshold voltage of the transistor can be positive. Accordingly, a so-called normally-off switching element can be obtained. For example, in the case where In—Ga—Zn—O containing nitrogen is used, In—Ga—Zn—O having higher nitrogen concentration than at least the semiconductor layer 331, specifically, In—Ga—Zn—O having a nitrogen concentration of 7 atomic percent or higher is used.

The conductive layer 338 is provided over the conductive layer 336a with the insulating layer 333 provided therebetween.

Here, the capacitor 302 is formed using the conductive layer 336a, the insulating layer 333, and the conductive layer 338.

The insulating layer 339 is provided over the insulating layer 333 and the conductive layers 334 and 338.

A material that is similar to the material of the insulating layer 317 can be used for the insulating layer 339.

The connection layer 341 is provided to fill an opening in the insulating layer 339 and is electrically connected to the conductive layer 338.

The structures of the connection layer 341 can be similar to that of the connection layer 318.

The conductive layer 342 is provided over the insulating layer 339. The conductive layer 342 is electrically connected to the conductive layer 338 with the connection layer 341 provided therebetween.

The structures of the conductive layer 342 can be similar to those of the conductive layer 319a, the conductive layer 319b, and the conductive layer 319c.

In this manner, the unit memory circuit in which the transistor 303 and the capacitor 302 are stacked over another element (e.g., the transistor 301) included in the first memory element that is formed in a CMOS process can be formed.

With such a structure, the transistor 303 and the capacitor 302 can be formed directly over another element; thus, a function of holding information stored in the first memory element that is a volatile memory element can be added without an increase in the area occupied by the unit memory circuit. Further, with the use of a transistor including an oxide semiconductor which has extremely low off-state leakage current as the transistor 303, a nonvolatile memory element can be realized, overheads and the break-even time can be reduced; and power consumption of the power reception control device 101 can be suppressed.

(Embodiment 5)

A power reception device including a power reception control device according to one embodiment of the present invention is applicable to an electronic device that can wirelessly receive external power. Specific examples of the electronic device according to one embodiment of the present invention include display devices, laptops, image reproducing devices provided with recording media (typically, devices which reproduce the content of recording media such as digital versatile discs (DVDs) and have displays for displaying reproduced images), cellular phones, portable game machines, personal digital assistants, e-book readers, cameras such as video cameras and digital still cameras, goggle-type displays (head mounted displays), navigation systems, audio reproducing devices (e.g., car audio systems and digital audio players), copiers, facsimiles, printers, multifunction printers, automated teller machines (ATM), vending machines, and the like.

In addition, specific examples of electrical devices according to one embodiment of the present invention are as follows: lighting devices, portable CD players, portable radios, tape recorders, headphone stereos, stereos, table clocks, wall clocks, cordless phone handsets, transceivers, portable wireless devices, car phones, calculators, electronic notebooks, electronic translators, audio input devices, electric shavers, electronic toothbrushes, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, tools such as chain saws, smoke detectors, and medical equipment such as dialyzers. Examples also include industrial equipment such as guide lights, traffic lights, belt conveyors, elevators, escalators, industrial robots, power storage systems, and power storage devices for leveling the amount of power supply and smart grid. In addition, moving objects driven by an electric motor using power from a lithium secondary battery are also included in the category of electric devices. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats or ships, submarines, helicopters, aircrafts, rockets, artificial satellites, space probes, planetary probes, and spacecrafts.

Figure 8A:
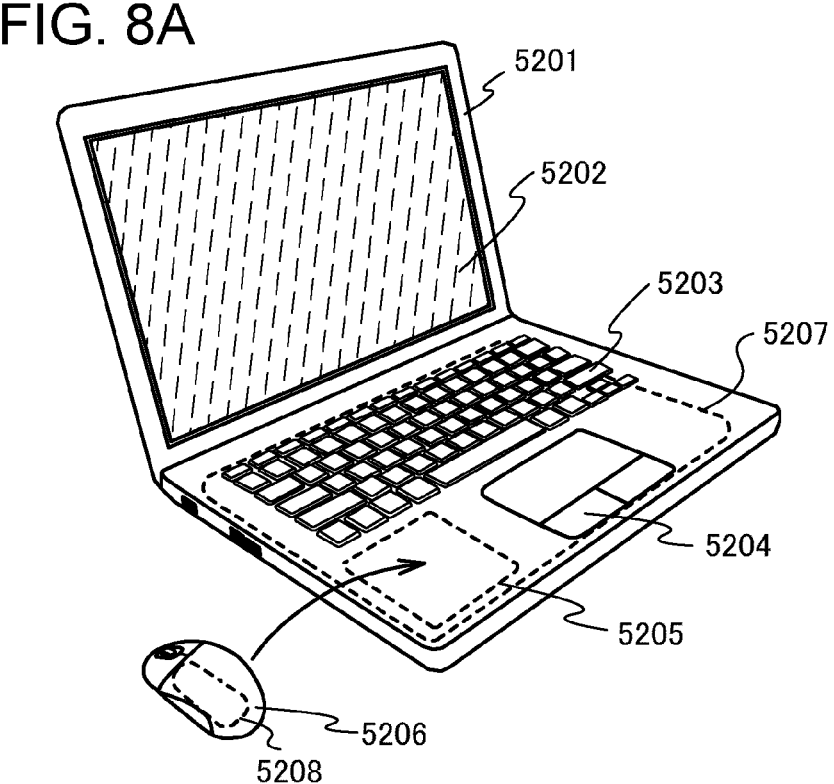
FIGS. 8A and 8B illustrate an example of an electronic device according to one embodiment of the present invention.

FIG. 8A illustrates a laptop that is an electronic device according to one embodiment of the present invention. The laptop in FIG. 8A includes a housing 5201, a display portion 5202, a keyboard 5203, a touch pad 5204, a power transmission device 5205, a power reception device 5207, and the like. A power reception device according to one embodiment of the present invention is provided for the power reception device 5207.

In the laptop in FIG. 8A, power from a power transmission device using electromagnetic resonance can be wirelessly received in the power reception device 5207. Further, the power can be supplied to another electronic device through the power transmission device 5205.

For example, FIG. 8A illustrates the case where power is supplied to a mouse 5206 that is a pointing device through the power transmission device 5205. The mouse 5206 is provided with the power reception device 5208 according to one embodiment of the present invention. Specifically, in FIG. 8A, the mouse 5206 is moved on the power transmission device 5205 of the laptop, as indicated by an arrow.

Figure 8B:
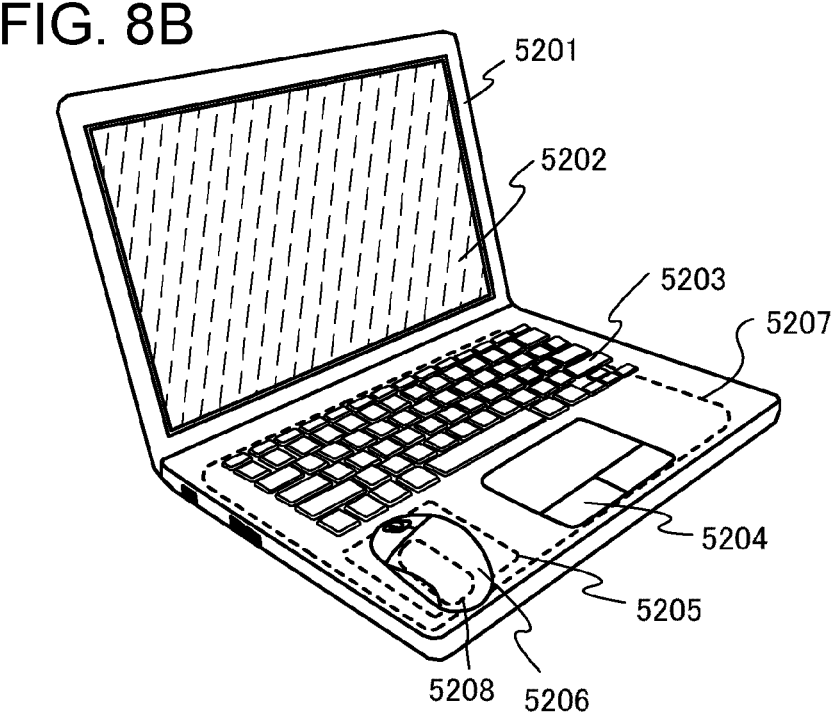

FIG. 8B illustrates the state where the mouse 5206 is placed on the power transmission device 5205. Under the above condition, power can be wirelessly supplied to the power reception device 5208 in the mouse 5206 through the power transmission device 5205. Note that in the case where the mouse 5206 receives power by electromagnetic resonance, unlike the case where the mouse 5206 receives power by electromagnetic induction, the mouse 5206 to be charged is not necessarily placed on the power transmission device 5205. In the case where the mouse 5206 receives power by electromagnetic resonance, by wireless power supply through the power transmission device 5205, a power transmission distance between the power transmission device and the mouse 5206 can be increased without a decrease in power transmission efficiency.

Figure 9A:
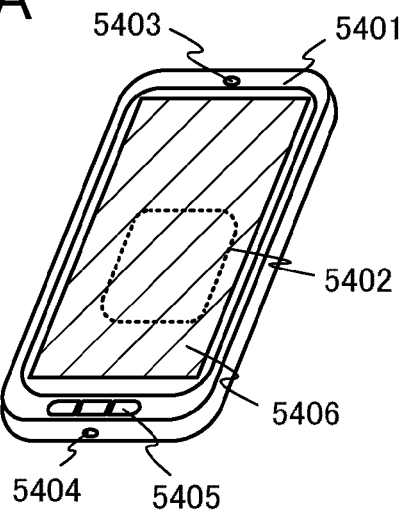
FIGS. 9A to 9C illustrate an example of an electronic device according to one embodiment of the present invention.

FIG. 9A illustrates a smartphone provided with a power reception device according to one embodiment of the present invention. The smartphone in FIG. 9A includes a housing 5401, a power reception device 5402, a speaker 5403, a microphone 5404, operation buttons 5405, and a display portion 5406 capable of touch control. Note that the power reception device 5402 includes a power reception device according to one embodiment of the present invention.

Figure 9B:
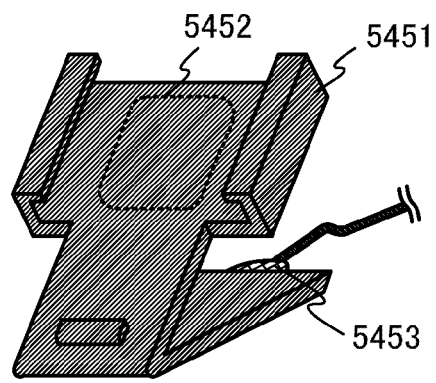

FIG. 9B illustrates a cradle provided with a power transmission device. The cradle in FIG. 9B includes a power transmission device 5452 in the housing 5451, and required power is supplied from the outside by a connector 5453.

Figure 9C:
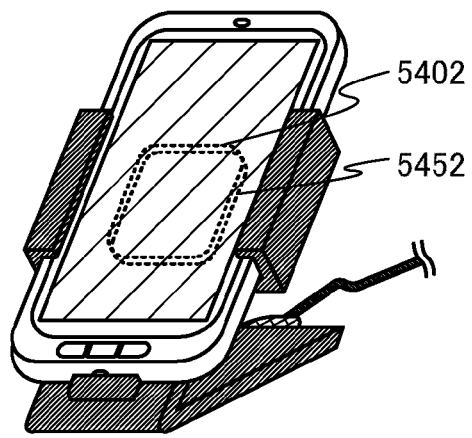

When power is supplied to the smartphone, the smartphone is placed in the cradle as illustrated in FIG. 9C. At this time, the smartphone is placed so that the power reception device 5402 of the smartphone overlaps with the power transmission device 5452 of the cradle. The smartphone is preferably fixed by provision of a supporting portion for the cradle so that the relative position of the power transmission device 5452 and the power reception device 5402 is not changed.

Note that a structure of the cradle is not limited to that shown in FIG. 9B as long as the smartphone can be supported fixedly by the cradle. For example, the cradle may have a turning mechanism which turns the smartphone from a vertical position to a horizontal position.

A power reception device according to one embodiment of the present invention can be applied to a moving object powered by an electric motor. The moving object is a motor vehicle (a motorcycle or an ordinary motor vehicle with three or more wheels), a motor-assisted bicycle including an electric bicycle, an airplane, a vessel, a rail car, or the like.

Figure 10A:
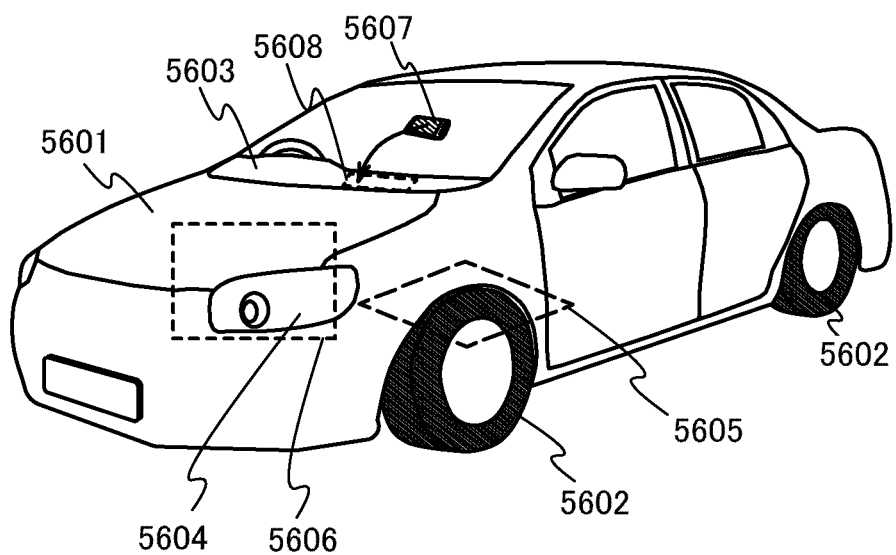
FIGS. 10A and 10B illustrate an example of application to an electric vehicle.

FIG. 10A illustrates an ordinary motor vehicle to which a power reception device according to one embodiment of the present invention is applied. The ordinary motor vehicle in FIG. 10A includes a car body 5601, wheels 5602, a dashboard 5603, lights 5604, a power reception device 5605, an electric motor 5606, and the like. The power reception device 5605 is provided with a power reception device according to one embodiment of the present invention. Note that although the power reception device 5605 is provide at the bottom of the car body 5601 in the ordinary motor vehicle in FIG. 10A, the power reception device 5605 can be provided in a portion other than the bottom of the car body 5601.

In the ordinary motor vehicle in FIG. 10A, power from a power transmission device can be wirelessly received in the power reception device 5605. The electric motor 5606 and the lights 5604 correspond to loads and are driven with the power. In the case where the ordinary motor vehicle includes a secondary battery, the power can be stored in the secondary battery. When the electric motor 5606 is driven, the operation of the wheels 5602 can be controlled.

Note that although the ordinary motor vehicle in FIG. 10A uses only the electric motor as a driving motor, the ordinary motor vehicle may use the electric motor and a combustion engine as driving motors. The combustion engine starts to operate when a plug is ignited with power supplied from the power supply device and can control the operation of the wheels 5602.

Further, the ordinary motor vehicle in FIG. 10A may be provided with the power transmission device in the car body and power can be supplied to another electronic device.

For example, in FIG. 10A, power can be supplied to a smartphone 5607 that is one of cellular phones through the power transmission device 5608 embedded in the dashboard 5603. Specifically, in FIG. 10A, the smartphone 5607 is moved on the dashboard 5603 of the ordinary motor vehicle, as indicated by an arrow.

Figure 10B:
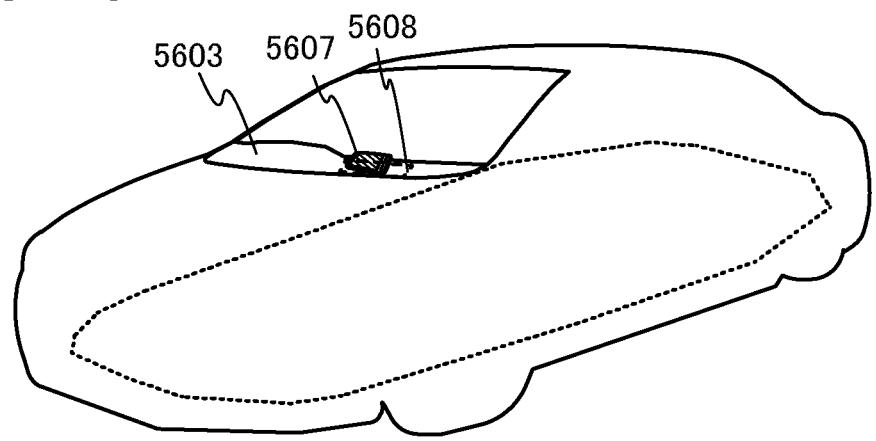

FIG. 10B illustrates a state in which the smartphone 5607 is placed on the dashboard 5603. Note that FIG. 10B illustrates the outline of the ordinary motor vehicle, the dashboard 5603, the power transmission device 5608, and the smartphone 5607 in order to clearly describe the positional relationship between the smartphone 5607 and the power transmission device 5608 in the ordinary motor vehicle. Under the above condition, power output from the power transmission device 5608 can be wirelessly supplied to the smartphone 5607.

As described above, by the provision of a power reception device according to one embodiment of the present invention in an electronic device or a moving object, an electronic device or a moving object in which power consumption at the time of wireless power supply is reduced can be provided.

This embodiment can be combined with any of the other embodiments disclosed in this specification as appropriate.

This application is based on Japanese Patent Application serial no. 2012-102271 filed with Japan Patent Office on Apr. 27, 2012, the entire contents of which are hereby incorporated by reference.

What is claimed is:

1. A power reception device comprising:
   a communication control unit comprising a memory unit; and
   a power source control unit configured to control supply of power supply voltage to the communication control unit, the power source control unit comprising a switch electrically connected to the communication control unit,
   wherein the memory unit comprises:
      a first transistor, a channel formation region of the first transistor comprising a semiconductor substrate;
      an insulating film over the first transistor; and
      a second transistor over the insulating film, a channel formation region of the second transistor comprising an oxide semiconductor, and
   wherein the second transistor is provided over the semiconductor substrate with the insulating film provided therebetween.

2. The power reception device according to claim 1, further comprising a clock generation unit configured to generate a clock signal from a power receiving signal supplied from a power receiving unit.

3. The power reception device according to claim 2, wherein the power receiving unit comprises an antenna.

4. The power reception device according to claim 1, further comprising:
   a clock generation unit configured to generate a clock signal from a power receiving signal supplied from a power receiving unit; and
   a counter unit configured to measure a communication period in accordance with the clock signal,
   wherein the power source control unit stops the supply of the power supply voltage to the communication control unit by turning off the switch in accordance with a signal supplied from the counter unit.

5. The power reception device according to claim 4, further comprising a power receiving detection unit configured to detect the power receiving signal and generate a detection signal,
   wherein the power source control unit starts supplying the power supply voltage to the clock generation unit and the counter unit in accordance with the detection signal.

6. The power reception device according to claim 1, wherein an off-state current per micrometer of a channel width of the second transistor is $1 \times 10^{-21}$ A or lower at room temperature and $1 \times 10^{-19}$ A or lower at 85° C.

7. A power reception device comprising:
   a communication control unit comprising a memory unit;
   a power source control unit configured to control supply of power supply voltage to the communication control unit, the power source control unit comprising a switch electrically connected to the communication control unit;
   a clock generation unit configured to generate a clock signal from a power receiving signal supplied from a power receiving unit; and
   a power storage device configured to be charged power generated from the power receiving signal,
   wherein the memory unit comprises:
      a first transistor, a channel formation region of the first transistor comprising a semiconductor substrate;
      an insulating film over the first transistor; and
      a second transistor over the insulating film, a channel formation region of the second transistor comprising an oxide semiconductor, and
   wherein the second transistor is provided over the semiconductor substrate with the insulating film provided therebetween.

8. The power reception device according to claim 7, wherein the power receiving unit comprises an antenna.

9. The power reception device according to claim 7, further comprising a counter unit configured to measure a communication period in accordance with the clock signal,
   wherein the power source control unit stops the supply of the power supply voltage to the communication control unit by turning off the switch in accordance with a signal supplied from the counter unit.

10. The power reception device according to claim 9, further comprising a power receiving detection unit configured to detect the power receiving signal and generate a detection signal,
    wherein the power source control unit starts supplying the power supply voltage to the clock generation unit and the counter unit in accordance with the detection signal.

11. The power reception device according to claim 7, wherein an off-state current per micrometer of a channel width of the second transistor is $1\times10^{-21}$ A or lower at room temperature and $1\times10^{19}$ A or lower at 85° C.

12. A power reception device comprising:
- a communication control unit comprising a memory unit; and
- a power source control unit configured to control supply of power supply voltage to the communication control unit, the power source control unit comprising a switch electrically connected to the communication control unit,
- wherein the memory unit comprises:
  - a first transistor, a channel formation region of the first transistor comprising a semiconductor substrate;
  - an insulating film over the first transistor; and
  - a second transistor over the insulating film, a channel formation region of the second transistor comprising an oxide semiconductor,
- wherein the second transistor is provided over the semiconductor substrate with the insulating film provided therebetween, and
- wherein the oxide semiconductor comprises indium, gallium, and zinc.

13. The power reception device according to claim 12, further comprising a clock generation unit configured to generate a clock signal from a power receiving signal supplied from a power receiving unit.

14. The power reception device according to claim 13, wherein the power receiving unit comprises an antenna.

15. The power reception device according to claim 12, further comprising:
- a clock generation unit configured to generate a clock signal from a power receiving signal supplied from a power receiving unit; and
- a counter unit configured to measure a communication period in accordance with the clock signal,
- wherein the power source control unit stops the supply of the power supply voltage to the communication control unit by turning off the switch in accordance with a signal supplied from the counter unit.

16. The power reception device according to claim 15, further comprising a power receiving detection unit configured to detect the power receiving signal and generate a detection signal,
- wherein the power source control unit starts supplying the power supply voltage to the clock generation unit and the counter unit in accordance with the detection signal.

17. The power reception device according to claim 12, wherein an off-state current per micrometer of a channel width of the second transistor is $1\times10^{-21}$ A or lower at room temperature and $1\times10^{-19}$ A or lower at 85° C.

* * * * *

UNITED STATES PATENT AND TRADEMARK OFFICE
CERTIFICATE OF CORRECTION

PATENT NO. : 9,829,946 B2
APPLICATION NO. : 15/059705
DATED : November 28, 2017
INVENTOR(S) : Misako Miwa et al.

It is certified that error appears in the above-identified patent and that said Letters Patent is hereby corrected as shown below:

In the Claims

In Claim 11, at Column 31, Line 2, "$1 \times 10^{19}$" should be --$1 \times 10^{-19}$--.

Signed and Sealed this
Twenty-second Day of May, 2018

Andrei Iancu
*Director of the United States Patent and Trademark Office*